United States Patent
Zarrouk

(10) Patent No.: US 11,008,058 B2
(45) Date of Patent: May 18, 2021

(54) SYSTEM FOR TRANSFERRING ROTATIONAL, MECHANICAL MOTION INTO SINUSOIDAL WAVE-LIKE MOTION

(71) Applicant: B.G. NEGEV TECHNOLOGIES AND APPLICATIONS LTD., AT BEN-GURION UNIVERSITY, Beer-Sheva (IL)

(72) Inventor: David Zarrouk, Bnei Brak (IL)

(73) Assignee: B.G. NEGEV TECHNOLOGIES AND APPLICATIONS LTD., AT BEN-GURION UNIVERSITY, Beer-Sheva (IL)

( * ) Notice: Subject to any disclaimer, the term of this patent is extended or adjusted under 35 U.S.C. 154(b) by 125 days.

(21) Appl. No.: 16/078,661

(22) PCT Filed: Feb. 21, 2017

(86) PCT No.: PCT/IL2017/050216
§ 371 (c)(1),
(2) Date: Aug. 22, 2018

(87) PCT Pub. No.: WO2017/145150
PCT Pub. Date: Aug. 31, 2017

(65) Prior Publication Data
US 2019/0168832 A1 Jun. 6, 2019

Related U.S. Application Data

(60) Provisional application No. 62/298,481, filed on Feb. 23, 2016.

(51) Int. Cl.
*B62D 57/032* (2006.01)
*B62D 57/02* (2006.01)
(Continued)

(52) U.S. Cl.
CPC ........... *B62D 57/032* (2013.01); *B62D 57/02* (2013.01); *B62D 57/028* (2013.01); *F04B 19/00* (2013.01); *F04B 19/08* (2013.01); *F16H 25/14* (2013.01)

(58) Field of Classification Search
CPC .... B62D 57/032; B62D 57/02; B62D 57/028; F04B 19/00; F04B 19/08; F16H 25/14
(Continued)

(56) References Cited

U.S. PATENT DOCUMENTS 2,244,418 A * 6/1941 Bennet .................... F04B 45/10
417/474
4,482,347 A * 11/1984 Borsanyi ........... A61M 5/14228
604/153
(Continued)

FOREIGN PATENT DOCUMENTS

| CN | 2928631 | 8/2007 |
|---|---|---|
| CN | 102190021 | 9/2011 |

(Continued)

OTHER PUBLICATIONS

Search Report issued in EP Appln. No. 17755941.6 dated Sep. 16, 2019.
(Continued)

*Primary Examiner* — Kevin Hurley
*Assistant Examiner* — Felicia L. Brittman
(74) *Attorney, Agent, or Firm* — Nixon & Vanderhye P.C.

(57) ABSTRACT

The present invention relates to a device and method for transferring rotational, mechanical motion into sinusoidal wave-like motion. The device comprises at least one motor, generating rotational movement around a first Cartesian axis; an elongated rod, curved in the form of a helix, substantially aligned along said first Cartesian axis, and rotated by the at least one motor; a surface comprised of
(Continued)

discrete, connected hollow elements, wherein: (i) the curved rod is interlaced within the said discrete hollow elements, such that the surface is undulated, and the rotation of the curved rod dynamically changes the surface's shape, moving the discrete hollow elements along a second perpendicular Cartesian axis, thus creating a wave like motion; (ii) the width of each said discrete hollow element is slightly larger than the diameter of the helix-shaped rod, so as while rotating, the elongated rod is freely movable within the cavity of the discrete hollow elements, along the third perpendicular Cartesian axis; (iii) the said surface interacts with the surrounding medium or base-surface upon-which the device is moving, wherein said interaction is generated by said wave-like motion, such that the said interaction creates a propelling force that drives said device forward or backward along the said first Cartesian axis.

20 Claims, 15 Drawing Sheets

(51) Int. Cl.
  F04B 19/00 (2006.01)
  F04B 19/08 (2006.01)
  B62D 57/028 (2006.01)
  F16H 25/14 (2006.01)
(58) Field of Classification Search
  USPC .......................................................... 180/8.3
  See application file for complete search history.

(56) References Cited

U.S. PATENT DOCUMENTS

| 5,242,279 | A | * | 9/1993 | Knuth | A61M 5/14228 |
| | | | | | 417/474 |
| 7,617,891 | B2 | * | 11/2009 | Chan | B62D 57/00 |
| | | | | | 180/7.1 |
| 2007/0079997 | A1 | | 4/2007 | Chan et al. | |
| 2013/0216400 | A1 | | 8/2013 | Bucher et al. | |

FOREIGN PATENT DOCUMENTS

| CN | 102190021 A | * | 9/2011 |
| JP | 2013-159243 | | 8/2013 |

OTHER PUBLICATIONS

International Search Report for PCT/IL2017/050216, dated Jun. 19, 2017, 4 pages.
Written Opinion of the ISA for PCT/IL2017/050216, dated Jun. 19, 2017, 5 pages.
D. Glozman, et al., "A self-propelled inflatable earthworm-like endoscope actuated by single supply line," IEEE Transactions on Biomedical Engineering, vol. 57, No. 6, pp. 1264-1272, 2010.
D. Zarrouk, et al., "Analysis and design of one degree of freedom worm robots for locomotion on rigid and compliant terrain", ASME, Journal of Mechanical Design, vol. 134, No. 2, 2012.
Wen L, et al., "Understanding undulatory locomotion in fishes using an inertia-compensated flapping foil robotic device Bioinspiration & Biomimetics", 8, 4, 15 pages, 2013.
G. Taylor, "Analysis of the swimming of microscopic organisms", Proceedings of the Royal Society of London A: Mathematical, Physical and Engineering Sciences. vol. 209, No. 1099, pp. 447-461, 1951.
G. Taylor in "The action of waving cylindrical tails in propelling microscopic organisms", Proceedings of the Royal Society of London. Series A, Mathematical and Physical Sciences, pp. 225-239, 1952.
Hu T, et al., "Biological inspirations, kinematics modeling, mechanism design and experiments on an undulating robotic fin inspired by *Gymnarchus niloticus*", Mechanism and Machine Theory, 44, 633-45, 2009.
Daltorio KA, et al., "Efficient worm-like locomotion: slip and control of soft-bodied peristaltic robots", Bioinspiration &. Biomimetics, 2013, 8, 23 pages.
Phamduy P, "Robotic fish" IEEE Robotics & Automation Magazine, (doi:10.1109/MRA.2014.2381367), Mar. 2015, pp. 86-96.
Boxerbaum A S, et al., "Continuous wave peristaltic motion in a robot", International Journal of Robotics Research, 31(3), pp. 302-318.
Liu F et al., "Hydrodynamics of an undulating fin for a wave-like locomotion system design", IEEE/ ASME Transactions on Mechatronics, vol. 17, No. 3, Jun. 2012, pp. 554-562.
Zarrouk, D., et al: "Single actuator wave-like robot (SAW): design, modeling and experiments", Bioinspiriation & Biomimetics, 11.4 (2016):046004, Jul. 1, 2016, 14 pages.

* cited by examiner

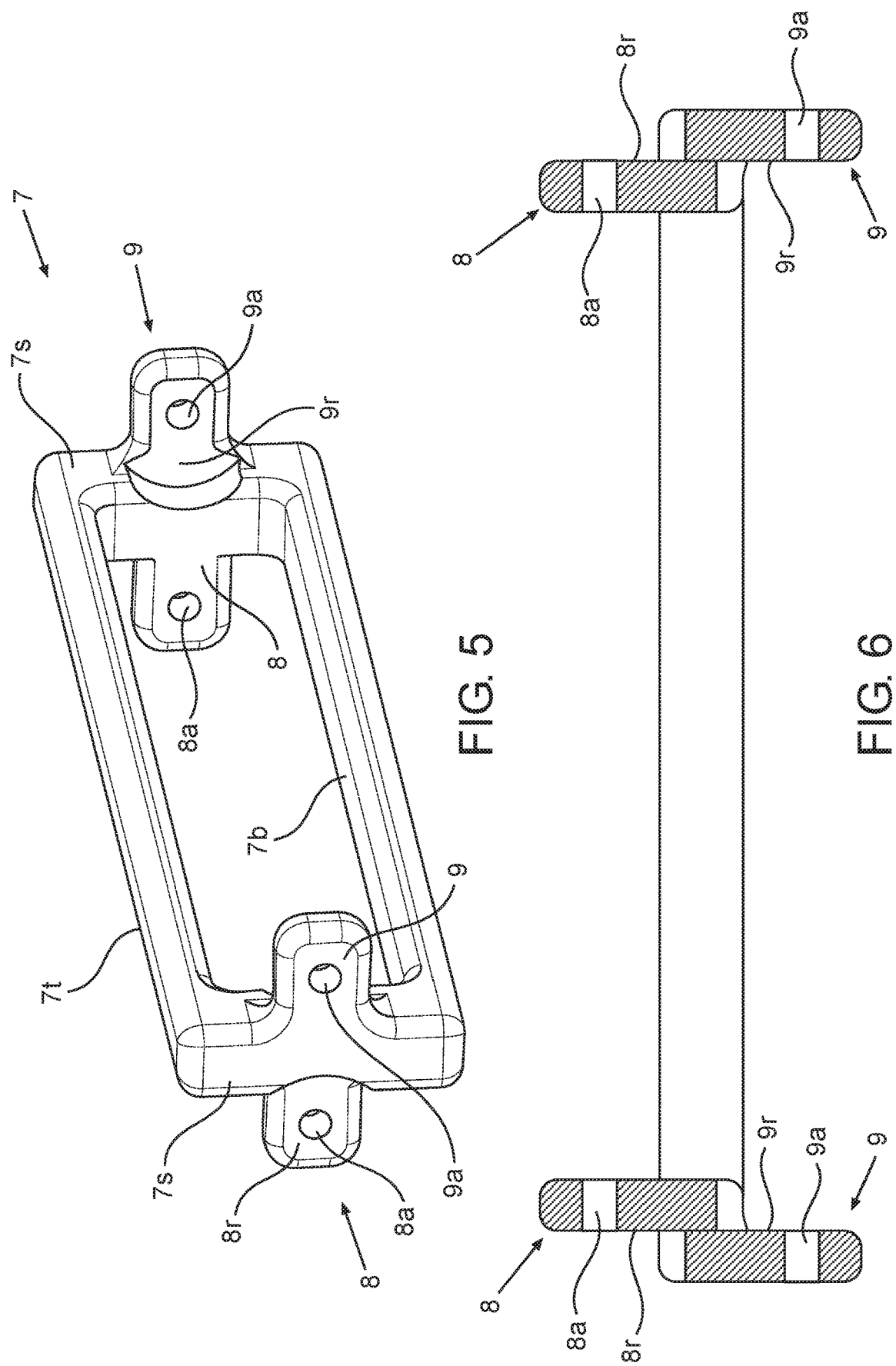

SYSTEM FOR TRANSFERRING ROTATIONAL, MECHANICAL MOTION INTO SINUSOIDAL WAVE-LIKE MOTION

This application is the U.S. national phase of International Application No. PCT/IL2017/050216 filed 21 Feb. 2017, which designated the U.S. and claims the benefit of U.S. Provisional Patent Application No. 62/298,481 filed 23 Feb. 2016, the entire contents of each of which are hereby incorporated by reference.

FIELD OF THE INVENTION

The present invention relates to the field mechanics. More particularly, the present invention relates to a mechanical system capable of transferring rotational, mechanical motion into sinusoidal wave-like motion.

BACKGROUND OF THE INVENTION

In the last decades, multiple studies have analyzed the locomotion of crawling robots inside tubes for maintenance purposes and in biological vessels for medical applications. In many of those applications, the robots must overcome rough terrain characterized by anisotropic properties, high flexibility, varying dimensions, and low friction coefficients. A key element in the design of small crawling robot is a minimalist approach, i.e. small number of motors and controllers, which allows for miniaturization. Two main locomotion patterns have been investigated: worm-like locomotion and undulating locomotion which resembles a continuously advancing wave.

Worm-like robots advance by changing the distance between their links. There are two types of worm-like robots; inchworm-like robots and earthworm-like robots. Inchworm-like robots are generally made of two or three cells fitted with clamps to increase or decrease the friction forces by changing the normal forces or the coefficients of friction. Earthworm-like robots are made of a larger number of cells, often four or more. Multiple mechanisms of locomotion were developed using magnet coils, shape memory alloys, an external electromagnetic field, and inflatable cells. Using the inflatable cells approach, D. Glozman, N. Hassidov, M. Senesh, and M. Shoham, "*A self-propelled inflatable earthworm-like endoscope actuated by single supply line,*" *IEEE Transactions on Biomedical Engineering*, vol. 57, no. 6, pp. 1264-1272, 2010, applied one actuator and a single air/water source to drive an inflatable worm made of multiple elastic cells inside the intestines of a swine. Novel designs of inchworm-like and earthworm-like robots actuated by a single motor were shown in D. Zarrouk, I. Sharf, and M. Shoham, "*Analysis and design of one degree of freedom worm robots for locomotion on rigid and compliant terrain*", *ASME, Journal of Mechanical Design*, vol. 134, no. 2, 2012. This minimalist design allowed to reduce the size, weight, energy consumption, and to increase the reliability of the robot.

Wave-like locomotion was successfully produced by hyper redundant snake robots only (even though, kinematically speaking a single actuator is required). A documented attempt to produce wave like locomotion dates back to the 1920s by artist Pyotr (Petr) Miturich (Wen L and Lauder G2013 *Understanding undulatory locomotion in fishes using an inertia-compensated flapping foil robotic device Bioinsp. Biomim.* 8 4) who suggested a design comprising an assembly of gears. G. Taylor in ["*Analysis of the swimming of microscopic organisms.*" Proceedings of the Royal Society of London A: Mathematical, Physical and Engineering Sciences. Vol. 209, No. 1099, pp. 447-461, 1951] and ["*The action of waving cylindrical tails in propelling microscopic organisms.*" Proceedings of the Royal Society of London. Series A, Mathematical and Physical Sciences, pp. 225-239, 1952] investigated the locomotion of wave-like and spiral-like locomotion in low Reynolds environment, expressed his inability to develop a mechanism that will allow to produce those motions in order to experimentally validate his analysis. More recently, some progress was reported by producing cyclic motion with a small number of actuators which to a certain extent resembles a wave but is actually a rigid straight spine with changing width, e.g. in references Hu T, Shen L, Lin L and Xu H 2009 *Biological inspirations, kinematics modeling, mechanism design and experiments on aundulating robotic fin inspired by Gymnarchus niloticus Mech. Mach. Theory* 44 633-45.

Daltorio K A, Boxerbaum A S, Horchler A D, Shaw K M, Chiel H J and Quinn R D 2013 *Efficient worm-like locomotion: slip and control of soft-bodied peristaltic robots Bioinsp. Biomim.* 8 3.

Phamduy P, LeGrand R and Porfiri M *Robotic fish IEEE Robot. Autom. Mag.* (doi:10.1109/MRA.2014.2381367).

Boxerbaum A S, Shaw K M, Chiel H J and Quinn R D 2012 *Continuous wave peristaltic motion in a Robot Int. J. Robot. Res.* 31 302-18.

Other attempts included producing a wave by vibrating a rod, e.g. in

Wen L and Lauder G 2013 *Understanding undulatory locomotion in fishes using an inertia-compensated flapping foil robotic device Bioinsp. Biomim.* 8 4.

Liu F, Lee K M and Yang C J 2012 *Hydrodynamics of an undulating fin for a wave-like locomotion system design IEEE/ASME Trans. Mechatronics* 17 554-62.

However, this method results in relatively small amplitudes whose size is a function of the damping.

It is therefore an object of the present invention to provide a system and method for transferring rotational, mechanical motion into sinusoidal wave-like motion.

It is further an object of the present invention to provide a single actuator robot that can advance in a wave-like locomotion.

Other objects and advantages of the present invention will become apparent as the description proceeds.

SUMMARY OF THE INVENTION

The present invention relates to a method and system for transferring rotational, mechanical motion into sinusoidal wave-like motion. The present invention can produce a nearly perfect wave actuated by a single motor.

The present invention relates to a device comprising a plurality of discrete connected hollow elements and a helix shaped elongated rod passing therethrough. The plurality of discrete connected hollow elements are wide enough such that when the helix spins around its central axis the discrete hollow elements take the form of a moving wave. When the helix is parallel to the ground the connected hollow elements effectively "cancel" the helix horizontal motion and are effectively a projection of the helix vertical motion causing a moving wave-like pattern. According to one embodiment, the bottom points of the wave formed that touch the ground (the "minimum points") apply a force on the ground causing the wave device to propagate forward or backward (depending on the spinning direction).

The present invention relates to a device for transferring rotational, mechanical motion into sinusoidal wave-like motion. The device comprises:
- at least one motor, generating rotational movement around a first Cartesian axis;
- an elongated rod, curved in the form of a helix, substantially aligned along said first Cartesian axis, and rotated by the at least one motor;
- a surface comprised of discrete, connected hollow elements, wherein:
    - the curved rod is interlaced within the said discrete hollow elements, such that the surface is undulated, and the rotation of the curved rod dynamically changes the surface's shape, moving the discrete hollow elements along a second perpendicular Cartesian axis, thus creating a wave like motion;
    - the width of each said discrete hollow element is slightly larger than the diameter of the helix-shaped rod, so as while rotating, the elongated rod is freely movable within the cavity of the discrete hollow elements, along the third perpendicular Cartesian axis;
    - the said surface interacts with the surrounding medium or base-surface upon-which the device is moving, wherein said interaction is generated by said wave-like motion, such that the said interaction creates a propelling force that drives said device forward or backward along the said first Cartesian axis.

According to an embodiment of the present invention, the set of Cartesian axes may be better understood in reference to the surface whereon the device is disposed. The first Cartesian axis may be along the length of the device parallel to said surface, the second Cartesian axis may be essentially perpendicular to said surface and to said first Cartesian axis and the third Cartesian axis may be parallel to said surface and perpendicular to said first and second Cartesian axis.

According to a preferred embodiment, the present invention relates to a moving snake-like robot, that advances due to the motor function propelling the wave-like configuration obtaining a continuous moving wave. The device locomotion principle differs from snakes by such that it does not slide and that it does not have anisotropic coefficient of friction but can still travel over a variety of surfaces and climb over obstacles.

The present invention can crawl, swim and climb with a wiggle and a wave. The present invention can have many uses including, sending a robot through piping e.g. for maintenance, swimming-search and rescue. The present invention may be used for medical purposed such as having a miniature robot design introduced into the intestine or other hollow body cavities for performing medical treatments or diagnostic treatments. The present invention may be used as a fun toy. The present invention system may be a conveying system wherein a conveyor comprises an elongated helical rod and the conveying surfaces comprise connected hollow elements wherein the rod is interlaced therethrough, wherein a wake-like motion is caused when the rod is rotated. A product may be conveyed along the moving wave minimum points. The present invention may also be used as a liquid pump if placed in a rectangular pipe (e.g. with a waterproof "sock" cover covering it). Also, the present invention may be used with the hollow elements making a wave-like motion with a waterproof element covering them and thus delivering liquid functioning in a similar manner as an Archimedes screw. Also, the opposite method can be used—water flow with pressure can be used to move the wave and transform it into a rotation (i.e. causing the helix to rotate).

BRIEF DESCRIPTION OF THE DRAWINGS

The present invention is illustrated by way of example in the accompanying drawings, in which similar references consistently indicate similar elements and in which:

FIG. 5 illustrates an embodiment of a single link of the present invention.

FIG. 6 illustrates a cross section of a link according to an embodiment of the present invention.

DETAILED DESCRIPTION OF THE INVENTION

Figure 1:
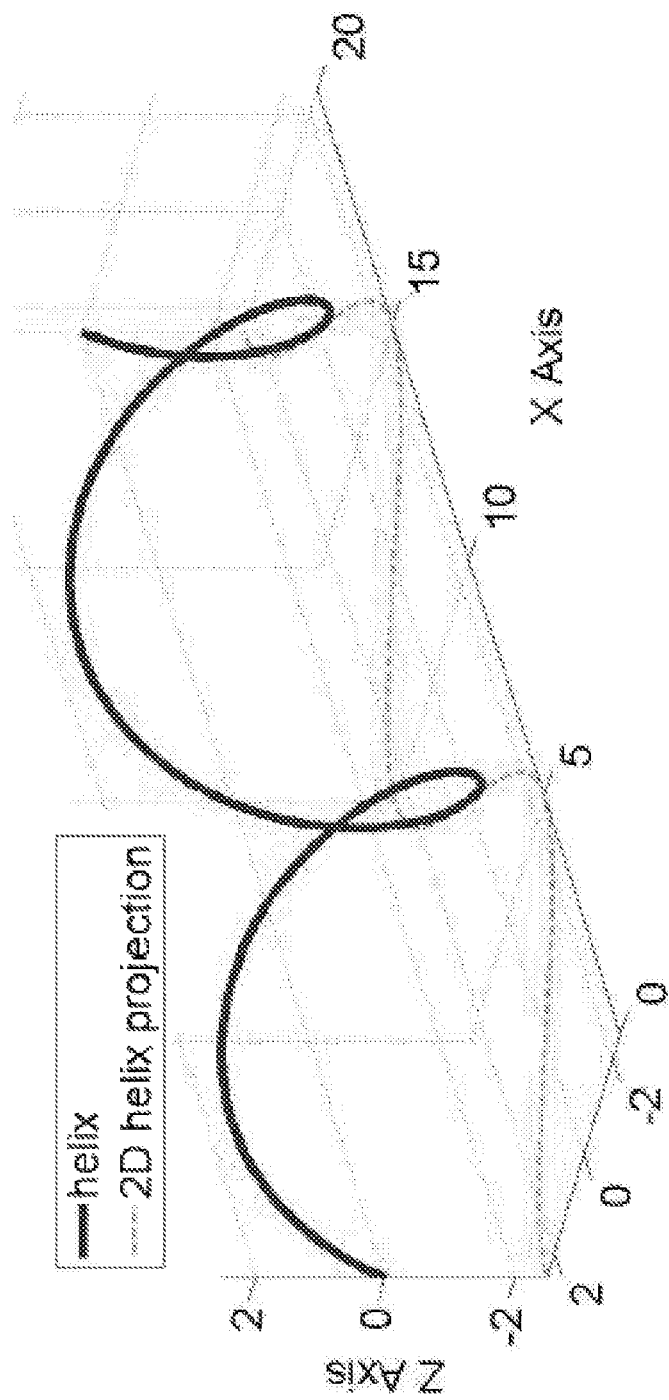
FIG. 1 illustrates a 3D helix projection on the X-Y plane.

The present invention relates to a method and system for transferring rotational, mechanical motion into sinusoidal wave-like motion. The present invention relates to a mono-actuated undulating locomotion generation system, that converts a rotational momentum, e.g. spiral rotational movement around an axis, into a controllable continuously advancing wave movement, e.g. pure sinusoidal locomotion.

The present invention relates to a device for transferring rotational, mechanical motion into sinusoidal wave-like motion. The device comprises:
- a. at least one motor, generating rotational movement around a first Cartesian axis;
- b. an elongated rod, curved in the form of a helix, substantially aligned along said first Cartesian axis, and rotated by the at least one motor;
- c. a surface comprised of discrete, connected hollow elements, wherein:
  - i. the curved rod is interlaced within the said discrete hollow elements, such that the surface is undulated, and the rotation of the curved rod dynamically changes the surface's shape, moving the discrete hollow elements along a second perpendicular Cartesian axis, thus creating a wave like motion;
  - ii. the width of each said discrete hollow element is slightly larger than the diameter of the helix-shaped rod, so as while rotating, the elongated rod is freely movable within the cavity of the discrete hollow elements, along the third perpendicular Cartesian axis;
  - iii. the said surface interacts with the surrounding medium or base-surface upon-which the device is moving, wherein said interaction is generated by said wave-like motion, such that the said interaction creates a propelling force that drives said device forward or backward along the said first Cartesian axis.

Preferably, the discrete hollow elements individually rotate about the said second Cartesian axis during the said wave-like motion, so as to apply a force component in the direction of the first Cartesian axis on the base surface, at the point of contact of each discrete hollow element with the base surface, thus propelling the device forward in the direction of the first Cartesian axis direction.

Preferably, if the device is set to move upon a horizontal surface, the said wave-like motion will include movement of the discrete hollow elements along the vertical axis, and thus will enable the device to overcome obstacles in its path by climbing over them.

Preferably, if the device is set to move upon a horizontal surface, the said force component in the direction of the first Cartesian axis will be applied by both the lower and upper discrete hollow elements, so as to enable the device to advance through horizontal narrow passageways defined by walls that are in contact with the device from above and below.

Preferably, if the device is set to move through vertical narrow passageways defined by walls that are in contact with the device on both sides of the wave-like shaped surface, the said force component in the direction of the first Cartesian axis will be applied by discrete hollow elements on both sides of the wave-like shaped surface, so as to enable the device to advance upwards or downwards through the said narrow vertical passageway.

Preferably, the pitch of the helix-shaped rod corresponds with the wave length of the created wave-shaped surface.

Preferably, the said connected discrete elements are implemented as a plurality of hollow links connected in series, wherein the said helix-shaped rod passes through the said plurality of hollow links.

Preferably, each link comprises a hollow rectangular shape with two side members, a top member and a bottom member, forming the rectangular shape.

Preferably, each link comprises two distal arms extending distally from the side members, one distal arm from each side member; and each link comprises two proximal arms extending proximally from the side members, one proximal arm from each side member.

Preferably, the angle between each distal arm and the side member it extends from is substantially a right angle; and wherein the angle between each proximal arm and the side member it extends from is substantially a right angle.

Preferably, each pair of distal arms of each of the links in the series, which has a distal link, connects to the proximal arms of the distal adjacent link in the series.

Preferably, the device is such that wherein
- i. each proximal arm and each distal arm comprises an aperture;
- ii. the proximal and distal arms comprise inner recessed regions;
- iii. each pair of distal arms of each of the links in the series that has a distal link, connect to the proximal arms of the distal adjacent link in the series;
- iv. the recessed regions of the distal arms of the link face the recessed regions of the proximal arms of the distal link such that the apertures in each distal arm of the link are aligned with the corresponding apertures on the same side, in each proximal arm of the distal link forming pairs of aligned apertures; and
- v. connecting means are inserted into each pair of aligned apertures.

Preferably, the motor is placed within a housing, and said housing is connected by means of hinge joints to two proximal arms extending proximally therefrom; and wherein the two proximal arms are connected at their proximal ends to the most distal link in the series of connected links to the most distal link's distal arms.

Preferably, the two proximal arms extending proximally from the motor housing each comprise an aperture near their proximal ends which are placed in a manner such that they are aligned with the corresponding apertures of the distal arms of the most distal link in the series of connected links forming pairs of aligned apertures; and wherein connecting means are inserted into each pair of aligned apertures.

Preferably, the top member and/or the bottom member of each rectangular link includes protrusions that elongate the distance between the center of the said rectangular links and their point of contact with the ground, thus increasing the device's travelled distance within each full rotation of the helix-shaped rod.

Preferably, the protrusions of each adjacent pair of rectangular links are designed in a spatially complementary manner, so as not to interfere with one another's movement, and not collide during the wave-like motion of the said surface.

Preferably, the protrusions of each adjacent group of three or more rectangular links are designed in a spatially complementary manner, so as not to interfere with one another's movement, and not collide during the wave-like motion of the said surface.

Preferably, the device further comprises at least one wheel located at one extremity of the device along the first Cartesian axis, enabling a user to steer the device in a preferred direction.

Preferably, the device further comprises a microcontroller, enabling a user to control at least one of the following parameters of the device's motion:
- a. speed of motor rotation;
- b. velocity of the wave-like motion of the undulated surface;
- c. speed of the device's propagation upon the base surface;

d. direction of the device's propagation along the first Cartesian axis;

e. steering direction of the at least one wheel.

The present invention relates to a device for transferring rotational, mechanical motion at a first Cartesian axis, into cyclic motion along a second perpendicular Cartesian axis, said device comprising:

a. at least one motor, generating rotational movement around a first Cartesian axis;

b. an elongated rod curved in a specific shape, substantially aligned along said first Cartesian axis, and rotated by the at least one motor;

c. a surface comprised of discrete, connected hollow elements, wherein:

i. the curved rod is interlaced within the said discrete hollow elements, such that the surface is shaped, and the rotation of the curved rod dynamically changes the surface's structure in accordance with the curved rod specific shape, moving the discrete hollow elements along a second perpendicular Cartesian axis, thus creating a cyclic motion;

ii. the width of each said discrete hollow element is slightly larger than the diameter of the curved-shaped rod, so as while rotating, the elongated rod is freely movable within the cavity of the discrete hollow elements, along the third perpendicular Cartesian axis;

iii. the said surface interacts with the surrounding medium or base-surface upon-which the device is moving, wherein said interaction is generated by said cyclic motion, such that the said interaction creates a propelling force that drives said device forward or backward along the said first Cartesian axis.

According to a preferred embodiment the elongated curved rod is in the form of simple helix (the tangent line at any point makes a constant angle with the fixed line axis). According to another embodiment, the "helix" is not on a circular basis thus obtaining different functions, e.g. the circle of the "helix" increases or decreases obtaining some sort of a (1+x)sin x function.

The present invention relates to a method for transferring rotational, mechanical motion at a first Cartesian axis, into sinusoidal wave-like motion along a second perpendicular Cartesian axis, said method comprising:

a. generating rotational movement around a first Cartesian axis of an elongated rod curved in a helix shape, substantially aligned along said first Cartesian axis, and rotated by the at least one motor;

b. moving the elongated rod within the cavity of connected discrete hollow elements, such that the discrete hollow elements form a surface having wave like shaped, and the rotation of the curved rod dynamically changes the surface's structure in accordance with the curved rod specific shape, moving the discrete hollow elements along a second perpendicular Cartesian axis, thus creating a wave like motion;

wherein the said surface interacts with the surrounding medium or base-surface upon-which the device is moving, wherein said interaction is generated by said wave-like motion, such that the said interaction creates a propelling force that drives said device forward or backward along the said first Cartesian axis.

Preferably, the device cross section of the helix rod is round.

According to a preferred embodiment of the present invention, the present invention relates to a single actuator wave-like robot (herein referred to as SAW), a robot which can move forward or backward by producing a continuously advancing wave, e.g. sinusoidal wave. The robot has an advantageous minimalistic mechanical design and produces an advancing wave, e.g. sine wave, with a defined, e.g. large amplitude, using only a single motor and not requiring any internal straight spine. The direction of locomotion is determined by the direction of rotation of the motor.

The SAW comprises a three-dimensional undulated rod, e.g spiral-shaped (helical) rod that passes through a series of connected links, configured to accommodate the rod and each link having a width being at least the rotational diameter of the rod. The rod is attached to or integrally formed with a rotational momentum source configured to rotate the helix around its central axis, e.g. to a circular rotatable surface driven by a single motor. Each of the series of connected links is wide enough to afford the rod to move freely therethrough while rotating, such that their connection forms a continuous wave motion and the links form propulsion or retropulsion movement (push forward or backward) when each of them come into contact with the surface at their turn.

Within this disclosure the terms "distal direction" as used in connection with the system is the direction towards the source or rotational momentum, e.g. motor (from the system body) and the "proximal direction" is opposite to the distal (e.g. the direction away from the motor). Therefore, as described herein, the motor itself is placed on the distal side of the system.

The dynamic motion of the SAW allows it to move over surfaces with different textures (such as sand, grass or gravel) and climb over obstacles or through tunnels. To effect directing the locomotion, according to one embodiment, the most distal link of the plurality of links (or the motor/motor housing) may be attached to a wheeled head, which is used for steering, and is not necessary for the body locomotion.

The wave motion mechanism can be produced in different sizes, e.g. large enough for search and rescue missions or small enough for medical applications. Additional uses are explained hereinafter.

The present invention may be easily and reliably manufactured. Due to the minimalistic design the SAW is characterized by a relatively light weight and needs no complex controllers to effect the wave motion. The power density is very high as all the work is being performed by a single motor with no "sleeping" motors.

The following portion explains part of the mathematical concept of the present invention function:

Kinematics of a Travelling Wave and Comparison to Rotating Helix:

According to the present invention concept, the projection of the rotating helix forms an advancing sine wave.

A. Traveling Wave

The simplest model of traveling wave is an advancing sine wave, or harmonic wave. Its mathematical presentation is $$y(x,t)=A \sin(kx-wt) \quad (1)$$

where x is the space coordinate, t is the time, y is the height of the wave at point x and time t, and A is the amplitude. The angular velocity w of the wave is related to the frequency by $$f = \frac{w}{2\pi} \quad (2)$$

and the wave length L of the traveling wave is related to the wave number by $$L = \frac{2\pi}{k} \qquad (3)$$

The travelling speed of the wave is thus $$V_{wave} = f \cdot L = \frac{w}{k} \qquad (4)$$

B. Mathematical Model of Helix and its Projection:

A helical curve with its axis in the x direction is described parametrically by $$x = \frac{L}{2\pi} \cdot a \qquad (5)$$
$$y = A\sin(a)$$
$$z = A\cos(a)$$

where L is the length of the pitch (the distance between two adjacent tips, i.e. how much the wave will move when the helix rotates by one full circle) and A is the radius of the helix and 'a' is the independent parameter. The two dimensional projection of the helix on the X-Y plane (z=0) yields the following sine function:

$$x = \frac{L}{2\pi} \cdot a \qquad (6)$$
$$y = A\sin(a) = A\sin\left(\frac{2\pi x}{L}\right)$$

A 3D helix whose axis is parallel to the x direction and its 2D projection on the X-Y plane are presented in FIG. 1. Its projection is a sine wave, as seen from Eq. (6), where the amplitude is the radius of the pitch.

C. Rotating Helix and Comparison to Traveling Wave.

When the helix rotates around its axis (the x axis) at a constant angular frequency w (counterclockwise) the parametric equations of the helix (Eq. (5)) are multiplied by the rotation matrix around the x axis:

$$\begin{bmatrix} x(a,t) \\ y(a,t) \\ z(a,t) \end{bmatrix} = \begin{bmatrix} 1 & 0 & 0 \\ 0 & \cos(wt) & -\sin(wt) \\ 0 & \sin(wt) & \cos(wt) \end{bmatrix} \begin{bmatrix} La/2\pi \\ A\sin(a) \\ A\cos(a) \end{bmatrix} = \begin{bmatrix} La/2\pi \\ A\sin(a-wt) \\ A\cos(a-wt) \end{bmatrix} \qquad (7)$$

Inserting $a=2\pi/L*x$ into y demonstrates that the projection of the rotating helix is an advancing sine wave given by:

$$y = A\sin\left(\frac{2\pi}{L}x - wt\right) \qquad (8)$$

Robot Design

In the previous section, it was shown that the projection of a rotating helix is an advancing sine wave. The present invention robot design, which uses a single motor to produce an advancing wave, follows the same concept.

Figure 2:
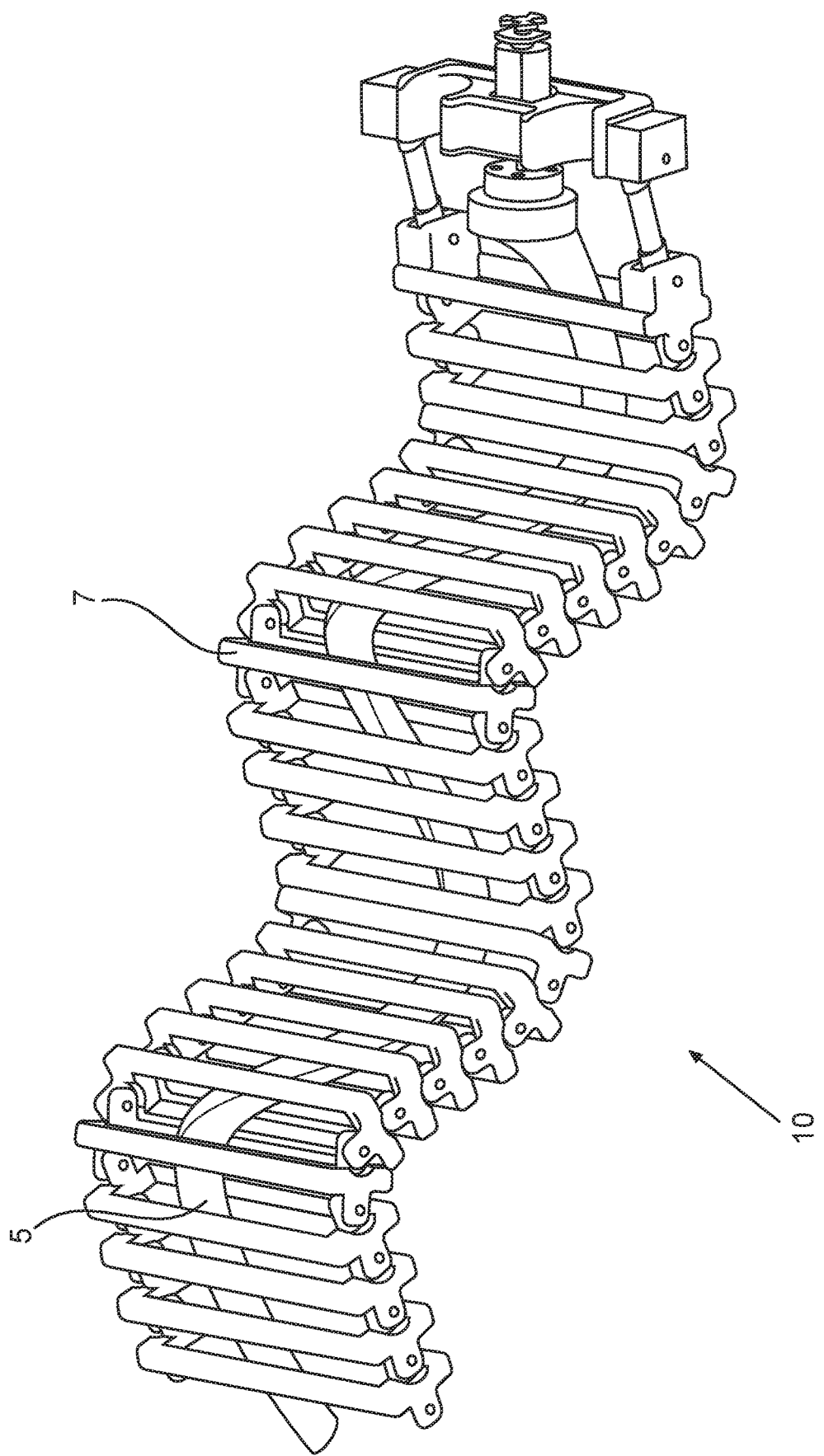
FIG. 2 illustrates a snake robot preferred embodiment of the present invention.

FIG. 2 shows a preferred embodiment of a SAW device 10 of the present invention. The SAW device comprises a helix spine 5 that constrains a series of connected links 7 to move around it, producing an advancing wave like motion.

The SAW device 10 comprises a motor 3 and a motor housing 4. The motor 3 is connected to the motor housing 4 (or fixed/attached thereto) and the motor axis to the helix. According to one embodiment the motor 3 is attached to a circular rotatable/spinning surface 6 and is configured to spin the circular rotatable surface 6 around its central axis.

Figure 3:
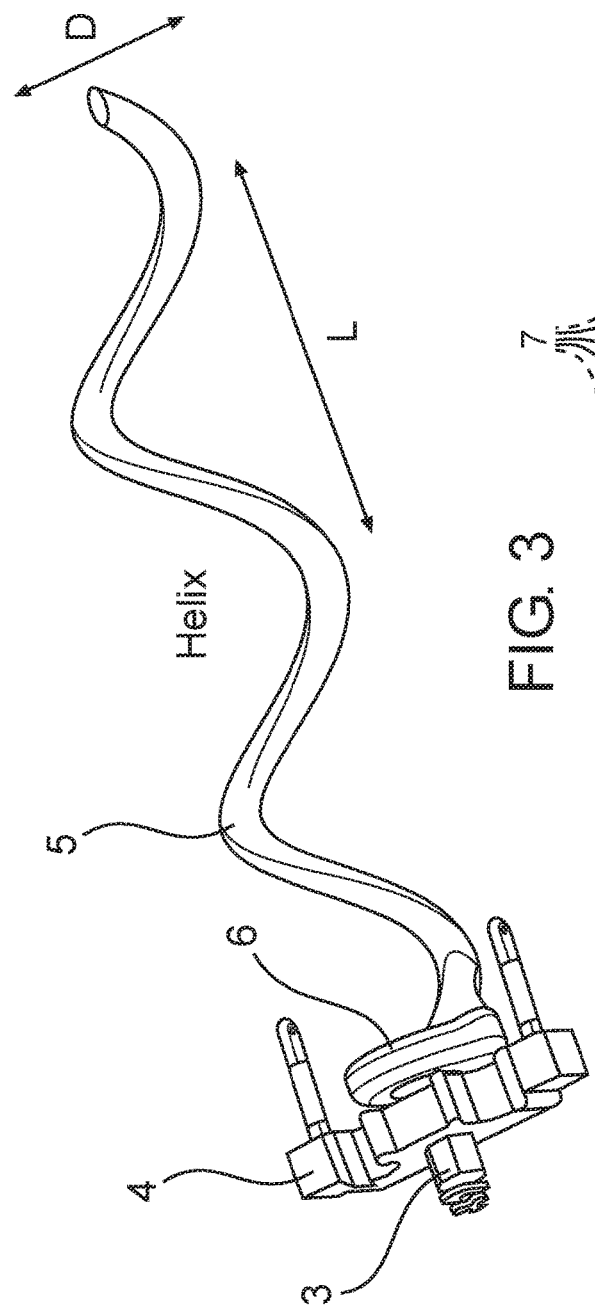
FIG. 3 illustrates an embodiment of the helix and the motor of the present invention.

The SAW device 10 comprises a spiral-shaped/helix rod 5 that acts like a central spine of the snake-like robot. As shown in FIG. 3, the helix rod 5 distal end is attached to the circular rotatable surface 6 and extends proximally therefrom in a manner such that when the motor 3 drives the spinning of the rotatable surface 6 the helix rod 5 rotates around its central axis. The cross-section of the helix rod 5 is round (e.g. circular, elliptical).

Figure 4:
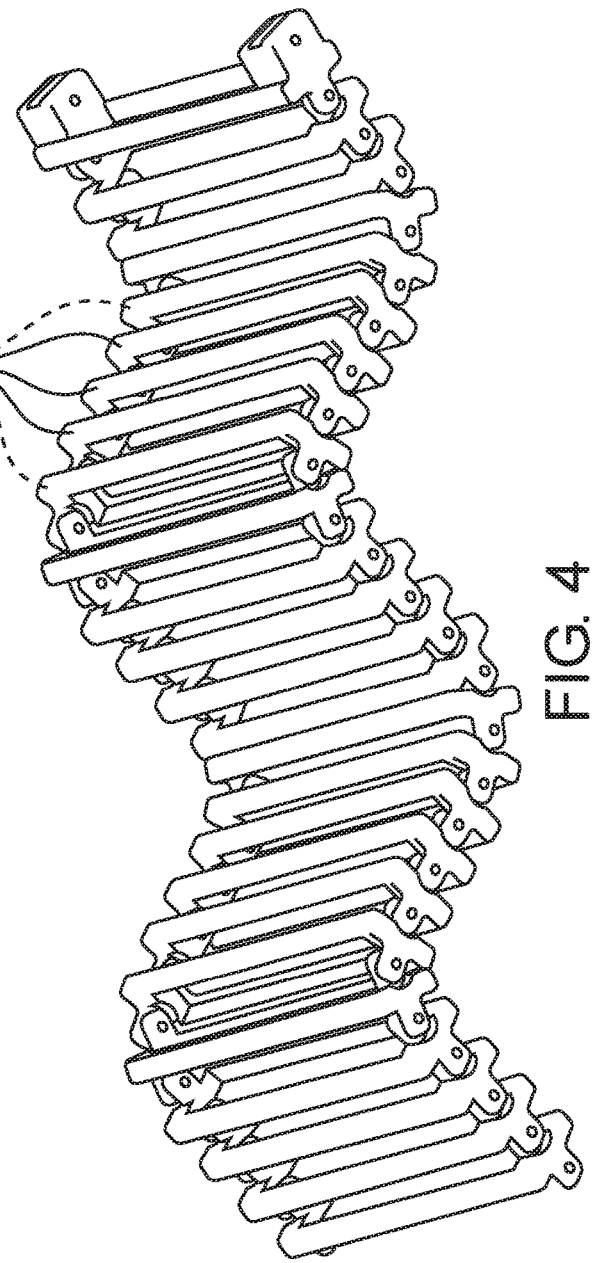
FIG. 4 illustrates an embodiment of the connected links of the present invention.

The SAW device 10 further comprises a plurality of links 7 connected in series, as shown in FIG. 4. The spine helix rod 5 passes through the plurality of links 7 (shown in FIG. 2).

Each link 7 comprises a hollow rectangular shape with two side members 7s, a top member 7t and a bottom member 7b, forming the rectangular shape, as shown in FIG. 5. Each link 7 comprises two distal arms 8 extending distally from the side members, one distal arm 8 from each side member 7s (preferably in a manner which forms a right angle between the distal arm 8 and the side member 7s). Each link 7 comprises two proximal arms 9 extending proximally from the side members 7s, one proximal arm 9 from each side member 7s (preferably in a manner which forms a right angle between the proximal arm 9 and the side member 7s). Each pair of distal arms 8 of each of the links in the series of the links, connect to the proximal arms 9 of the distal adjacent link in the series.

According to an embodiment of the present invention, each proximal arm 9 comprises an aperture 9a and each distal arm 8 comprises an aperture 8a. The proximal arms 9 comprise inner recessed regions 9r that face each other. Each distal arm 8 comprises a recessed region 8r facing outwards, i.e. facing the opposite direction in which the corresponding proximal arm 9 (extending from the same side member 7s) recessed region 9r faces. FIG. 6 shows a cross section of link 7 at its middle horizontal plane that includes the distal arms 8 and proximal arms 9.

Figure 7:
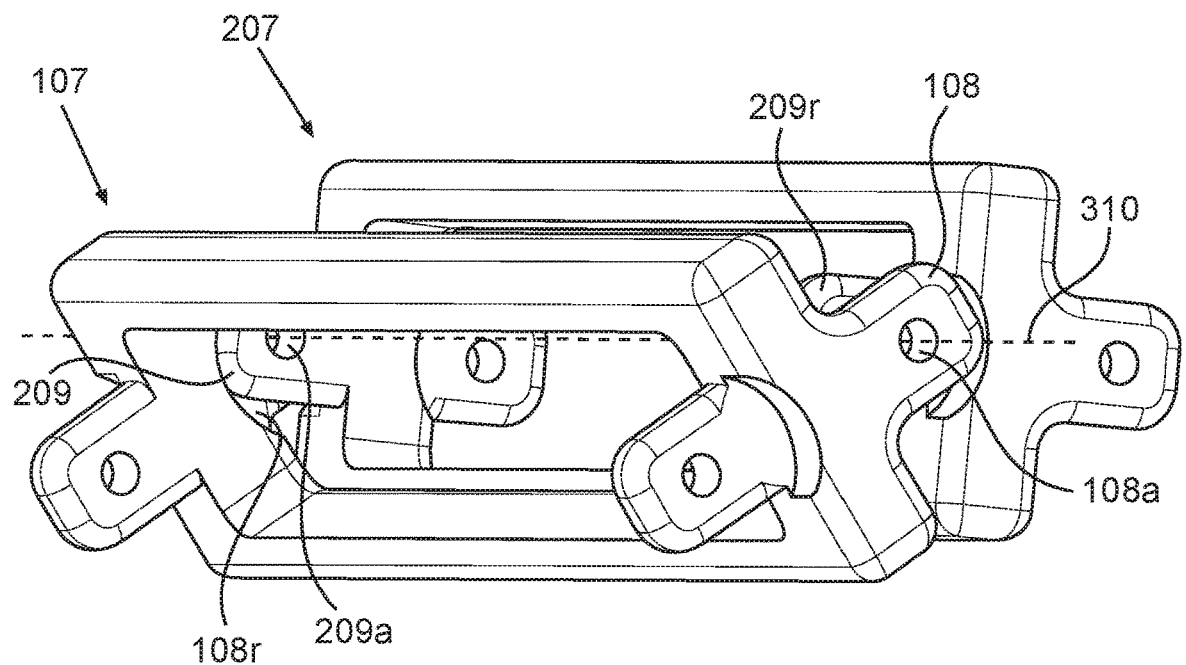
FIG. 7 illustrates two adjacent links according to an embodiment of the present invention.

Each pair of distal arms 8 of each of the links in the series of the links, connect to the proximal arms 9 of the distal adjacent link in the series. FIG. 7 shows the connection of two adjacent links—link 107 and its distal adjacent link 207. The connection is in a manner such that the distal arms 108 of link 107 are placed in between the proximal arms 209 of its distal adjacent links 207. The recessed regions 108r of the distal arms 108 of link 107 face the recessed regions 209r of the proximal arms 209 of link 207 in a manner such that the recessed regions 108r and 209r actually integrate and are such that the distal arms 108 of link 107 are complementary to the proximal arms 209 of link 207. The two adjacent links 107 and 207 are placed such that the apertures 108a in the distal arms 108 of link 107 and the apertures 209a in the proximal arms 209 of link 207 are aligned (each aperture with its near corresponding aperture on the same side) and form an elongated aperture. Connecting means such as corresponding pins, screws, etc., (not shown) are inserted into each pair of aligned apertures (the elongated apertures) forming a hinge joint, thus connecting the two links 107 and 207 together. The links 107 and 207 are rotatable one in relation to the other around an axis (the hinge axis) being the imaginary line 310 passing through the centers of the connecting means. The adjacent links can rotate around the imaginary line 310 axis until the bottom members in links 107 and 207 collide or until the top members in links 107 and 207 collide (or if one of the top or bottom members collides with the side members of its adjacent link).

Other embodiments of the present invention may include the distal arms of the links 7 comprising recessed regions facing each other and the proximal arms having recessed regions facing the opposite direction, with the connection in a similar manner as explained hereinabove, mutatis mutandis.

According to an embodiment of the present invention the motor housing 4 comprises two proximal arms 11 extending proximally therefrom. The proximal arms 11 are connected to the motor housing 4 (at their distal end) by means of a hinge joint. Thus proximal arms 11 are rotatable about the hinge axis.

Figure 8:
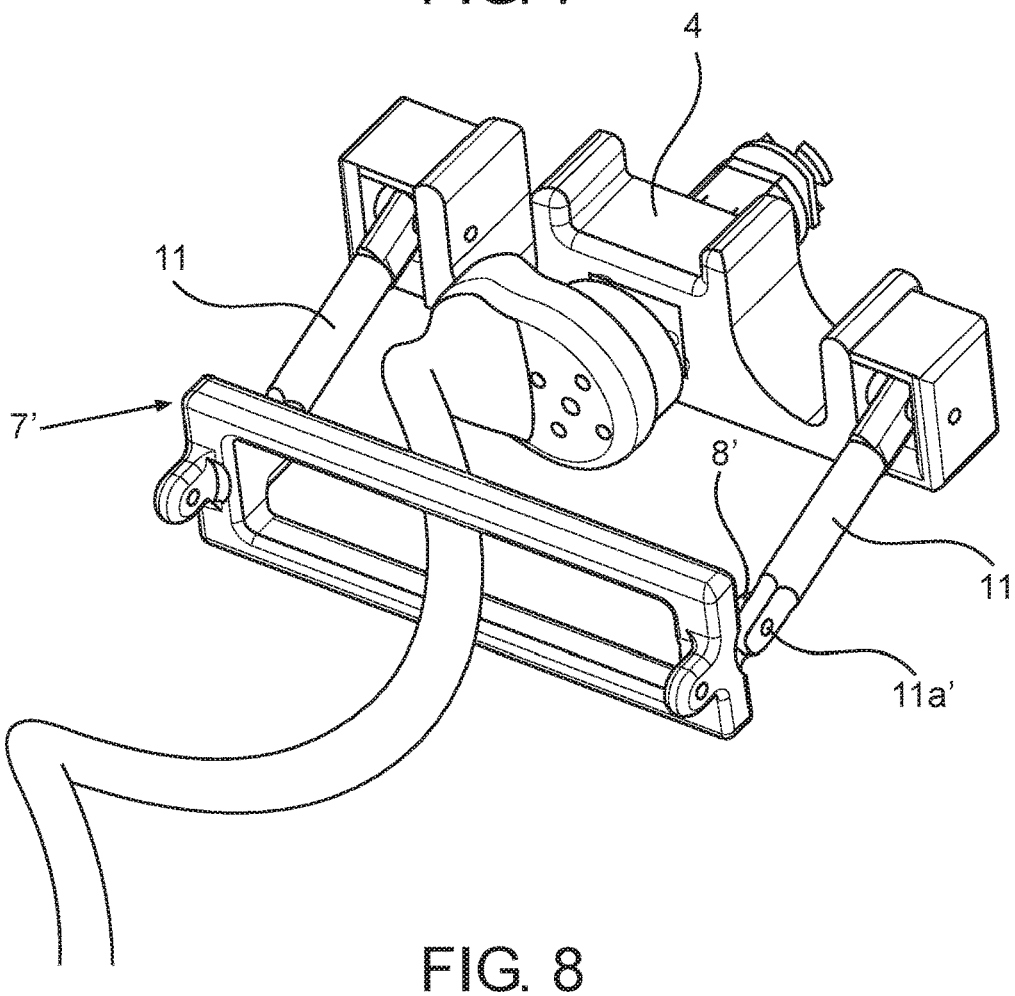
FIG. 8 illustrates an attachment of the housing to the most distal link according to an embodiment of the present invention.

The two proximal arms 11 are connected at their proximal ends to the most distal link in the series of connected links to the most distal link's distal arms 8'. Thus the series of links are attached to the housing 4 and do not undergo roll rotation. The two proximal arms 11 each comprise an aperture 11a placed near their proximal ends. The proximal arms 11 are placed such that the apertures (not shown) in the distal arms 8' of the most distal link 7' (shown in FIG. 8) and the apertures 11a in the proximal arms 11 are aligned (each aperture with its near corresponding aperture on the same side) and form an elongated aperture. Connecting means such as corresponding pins, screws, etc., are inserted into each pair of aligned apertures (the elongated apertures) forming a hinge joint, thus connecting the two proximal arms 11 to the most distal link 7'. The proximal arms 11 and the distal arms 8' are rotatable one in relation to the other about the hinge axis being the imaginary line passing through the centers of the connecting means. For illustration purposes and to obtain a better understanding of the connection between the most distal link 7' and the proximal arms 11, only the most distal link 7' has been illustrated in FIG. 8.

Other embodiments of the present invention may include the distal arms of the links comprising recessed regions facing each other and the proximal arms 11 placed to be connected accordingly in a similar manner as explained hereinabove, mutatis mutandis.

As the motor rotates the helix, the links cancel the rotation along the axis of the helix and maintain the vertical motion. In this way, the links act as a 2D projection of the helix of the robot. When the rod extends through the links, there is a small gap between the link and the helix. The helix, the housing and the links may be flexible or non-flexible and may be 3D printed and may comprise plastics, metals (e.g. steel), etc.

The length of the present invention may be of various sizes (e.g. as small as to go through body hollow cavities) and can be for example, between 1 mm and 10 m. The following elements may be at a variety of sizes corresponding to the length size of the SAW robot wherein the length of link 7 (from the edge of one side member 7s to the edge of the other side member 7s) is at least the diameter of the helix.

Figure 9:
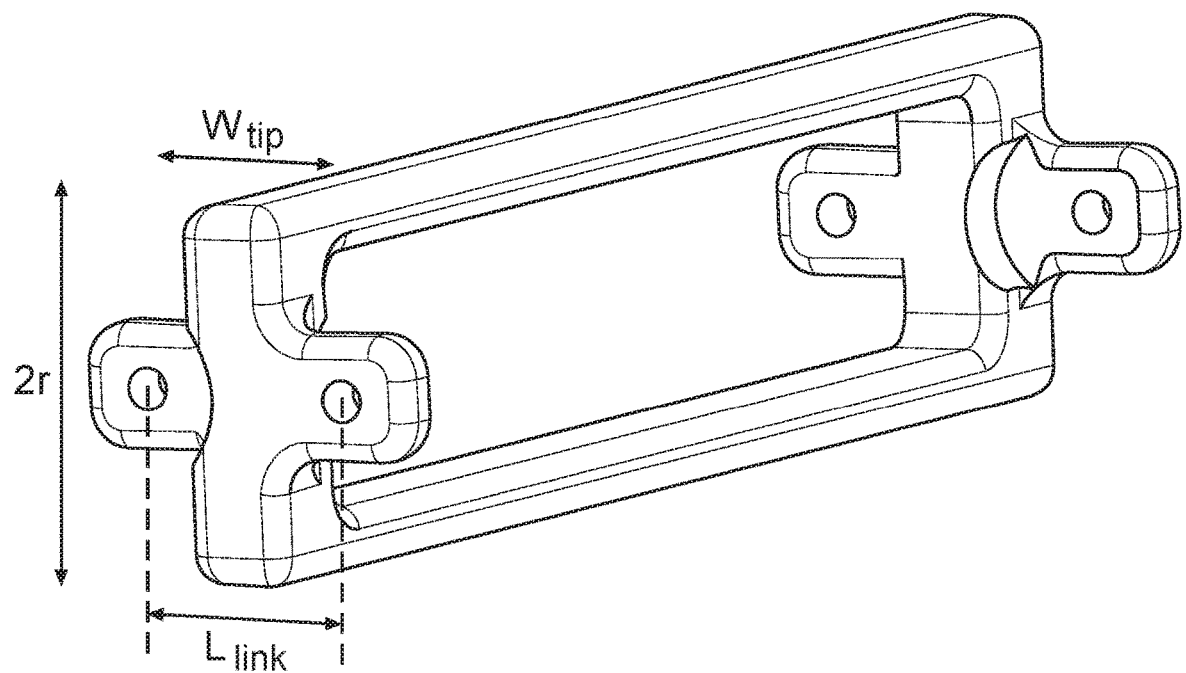
FIG. 9 illustrates an embodiment of a single link of the present invention.

$L_{link}$ is the distance along the distal-proximal axis, between the centers of the apertures 8a and 9a, as shown in FIG. 9.

$w_{tip}$ is the distance along the distal-proximal axis of the side/top/bottom members.

The height of link 7 (from the edge of the bottom member 7b to the edge of the top member 7t—referenced 2r in FIG. 9).

The length of link 7 (from the edge of one side member 7s to the edge of the other side member 7s)

The length of the proximal arm 9 and the length of the distal arm 8 (the distance along the distal-proximal axis).

The height of the proximal arm 9 and the height of the distal arm 8.

The thickness of the recessed regions 8r and 9r.

Figure 10:
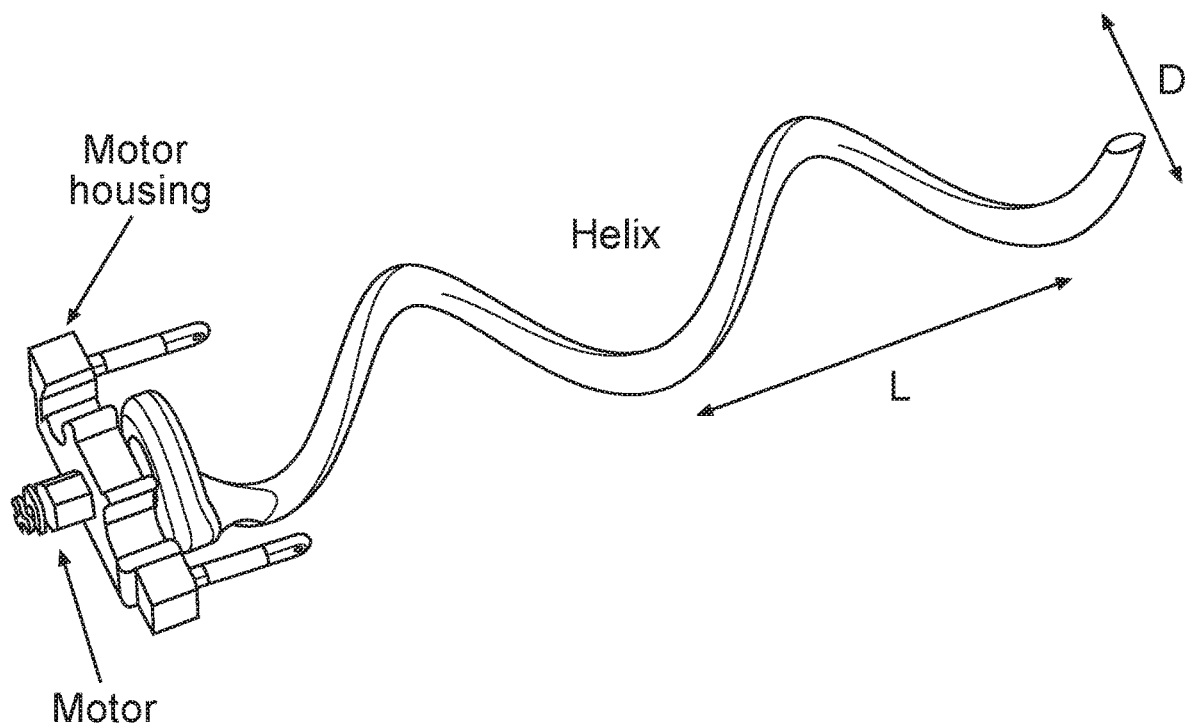
FIG. 10 illustrates an embodiment of the helix and the motor of the present invention.

The length of the pitch (length of one wave) L in FIG. 10).

The diameter of the helix (D in FIG. 10).

The diameter and thickness of circular rotatable surface 6.

All the above sizes may vary according to various models.

In a particular example, the length of the pitch (length of one wave) L in FIG. 10, is 10.4 cm, and the diameter of the helix D in FIG. 10 is 5.2 cm.

The length of link 7 is at least twice the radius of the helix. The amplitude of the wave is equal to the radius of the helix.

An example of the connecting means are insertable pins which may be glued to one of the links. In another embodiment screws are used (e.g. 2 mm screws).

According to one preferred example, the helix length is nearly 25 cm long and is composed of two windings and a short extension to reduce its diameter (at the portion that connects to the motor).

Its external diameter D is 5.2 cm and its radius is A=2.1 cm and the diameter of the "wire" (the rod) is 10 mm. The links are 7 cm wide ($w_{tip}$), 1.83 cm high (r=0.915 cm), and the distance between the apertures of two links is 1.2 cm ($L_{link}$=1.2 cm). There is a 3 millimeters gap between the link and the helix. Another preferred example of a smaller version is scaled down by a factor of nearly 1:2. Another preferred example of an even smaller version is scaled down by a factor of 1:3. The total weight of the larger robot including one battery is 188 grams, whereas the smaller one weighed only 47 grams.

The SAW device 10 is fitted with a motor such as a motor from Pololu robotics and electronics (e.g. Pololu motors items #1100, 2200, 1099, 2201, 993, 2202, other motors with gear box, etc.).

An example of a motor suitable for the present invention is a 6 Volt, 12 mm motor with 1:300 gear ratio. Based on its catalog specifications, the motors and gearbox produce a torque of 2.9 Kg-cm at 45 rpm. Another example of a battery suitable to work with the present invention is a single ~4V lithium-ion battery which is substantially lower than its nominal input (6-9 Volts). Multiple types of batteries may be used (e.g. lithium ion 3.7 volts with 300 to 400 mAh). The batteries are preferably placed inside the motor housing.

An example of a size of a miniature robot for medical purposes is a robot fitting in a hollow cylinder having a 1.5 cm diameter, wherein the length of the robot is 4 cm (e.g. similar to a capsule inserted into the body).

Turning Using Steering Wheels

Figure 20A:
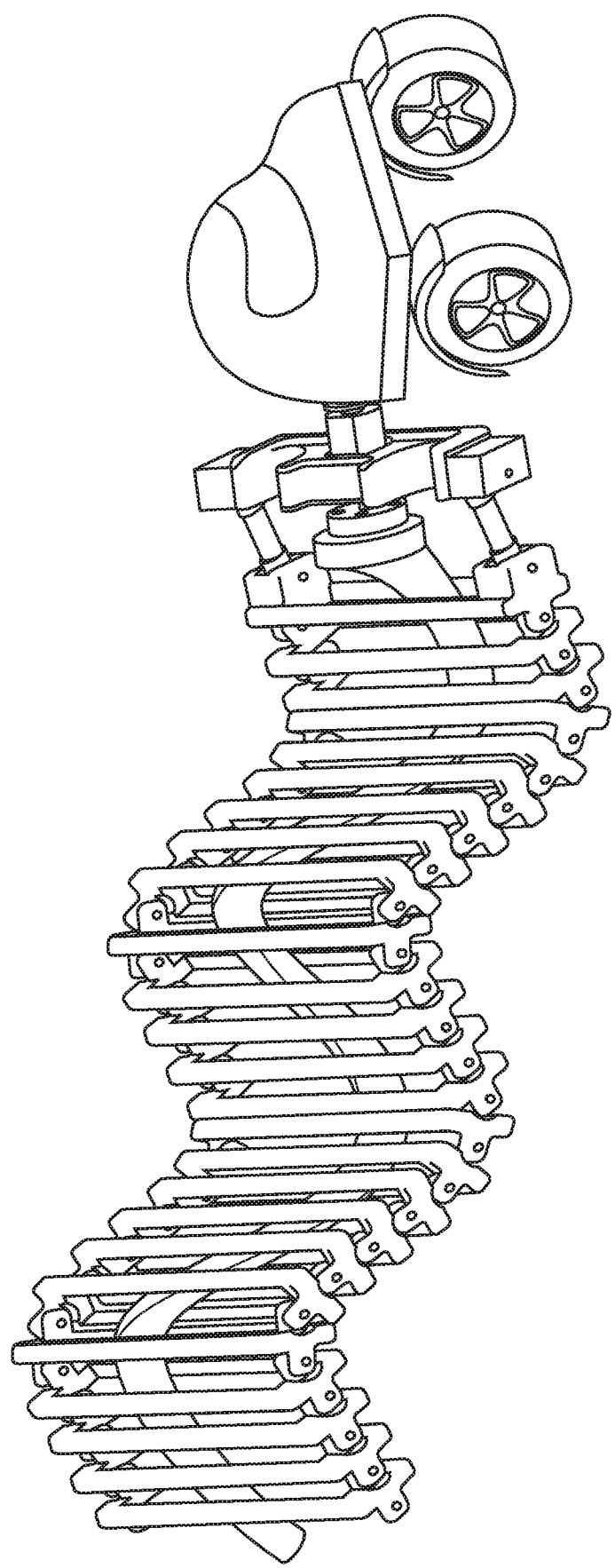
FIG. 20a illustrates an embodiment of the snake robot with steering wheels.

According to a preferred embodiment, the snake robot further comprises steering wheels at its front portion as shown in FIG. 20a. The robot may be controlled by using a two channel joystick which steers the wheels accordingly (wherein, for example, the joystick, the wheels, and the motor which steers the wheels may be extracted from an RC toy car). In general, the wheels are only used for steering wherein the spiral to wave mechanism is used for propulsion.

A multiple experiment was performed in crawling straight and turning and captured the position of the motor house using an Optitrack set up. The results show that the robot can turn to either direction and that the radius of turning was nearly 0.3 m (for the 25 cm long robot having a 10.4 cm length of the pitch).

Figure 20B:
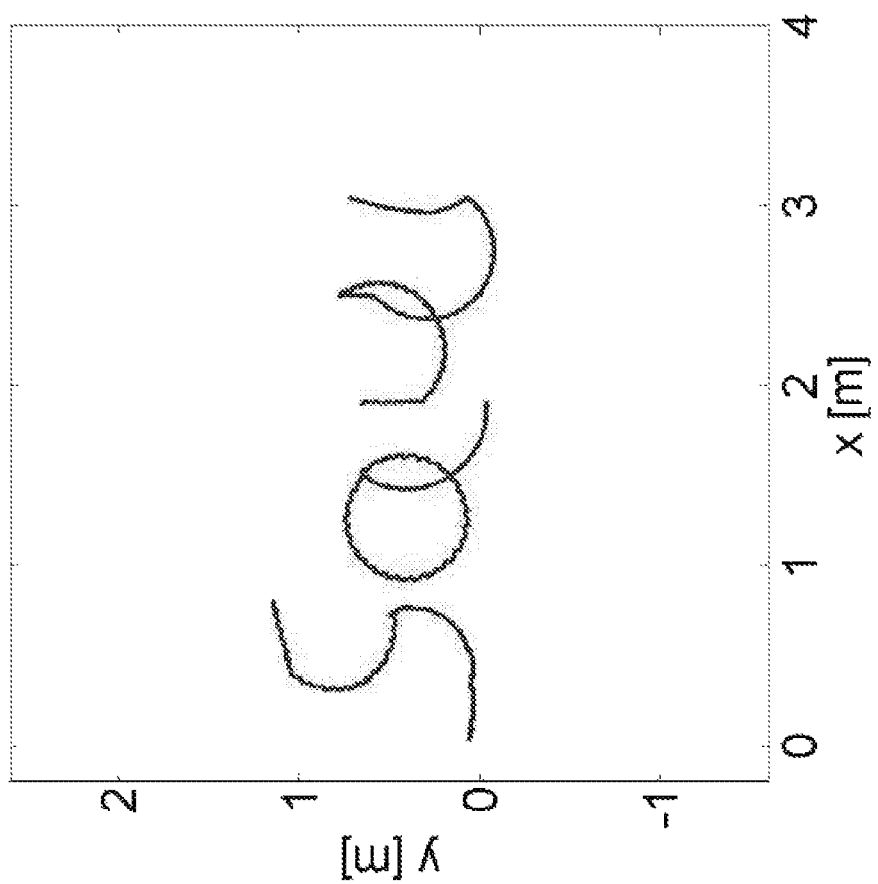
FIG. 20b shows a traveling course according to an embodiment of the present invention.

The results are presented in FIG. 20b in which the name of the robot is written (SAW). All the letters were completed in a single run with no external intervention.

Increasing the Height to Travel Faster than the Speed of the Wave

According to a preferred embodiment of the present invention, the top member and/or the bottom member of each rectangular link includes protrusions that elongate the distance between the center of the rectangular links and their point of contact with the ground, thus increasing the device's travelled distance within each full rotation of the helix-shaped rod. The protrusions preferably protrude the top/bottom link sides in a perpendicular manner.

Figure 21:
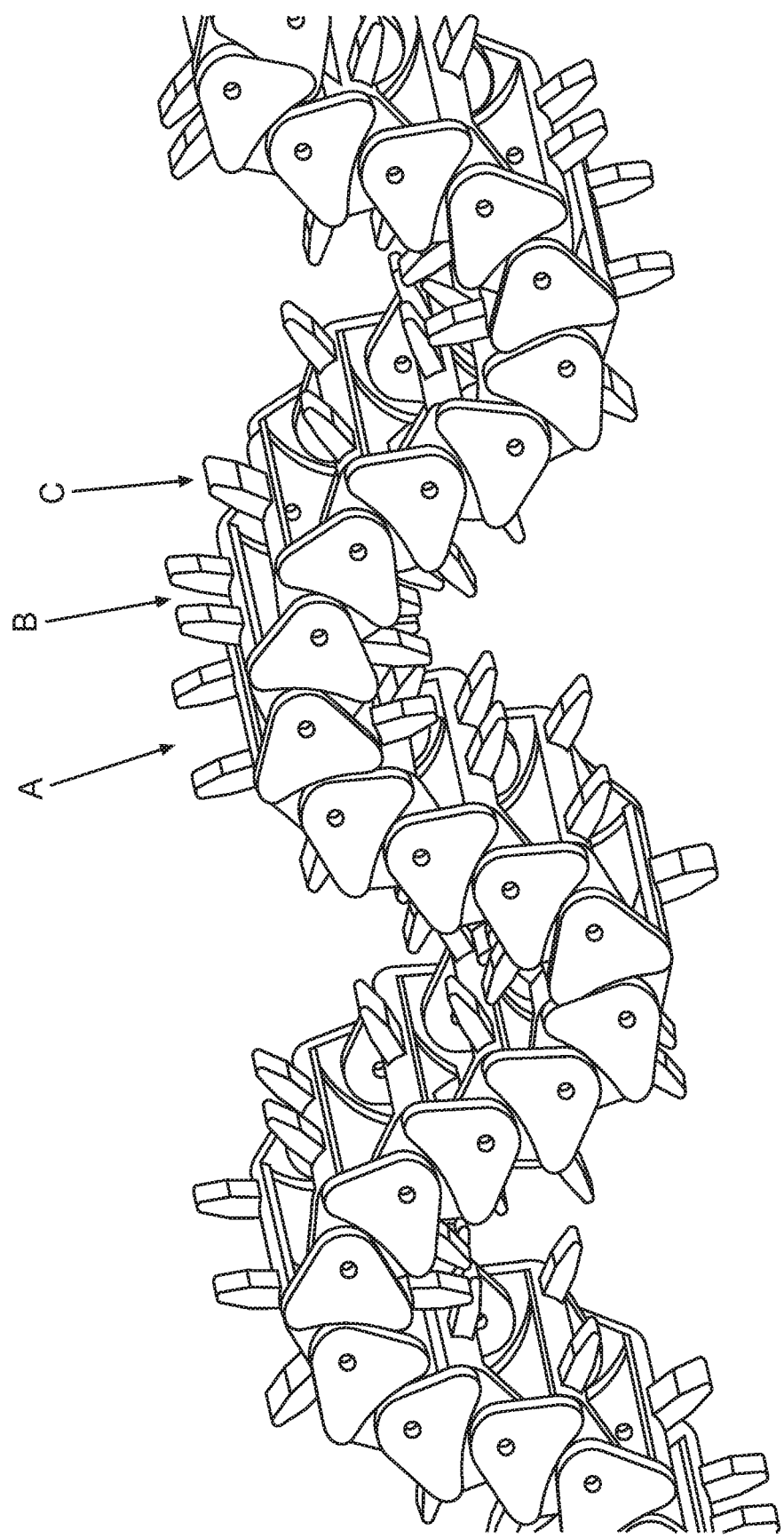
FIG. 21 illustrates an embodiment with protrusions on the links of the snake robot according to an embodiment of the present invention.

According to a preferred embodiment, the protrusions of each adjacent pair (or groups of three or more) of rectangular links are designed in a spatially complementary manner, so as not to interfere with one another's movement, and not collide during the wave-like motion of the said surface, as shown in FIG. 21. FIG. 21 shows the snake robot with sets of three adjacent links A, B and C, such that A comprises two protrusions extending from the sides of the link top/bottom, B comprises two protrusions such that in certain positions they are placed between the protrusions of A and do not collide with them. C comprises one protrusion extending from the center of the link top/bottom, such that in certain positions it is placed between the protrusions of B and does not collide with it.

Figure 22:
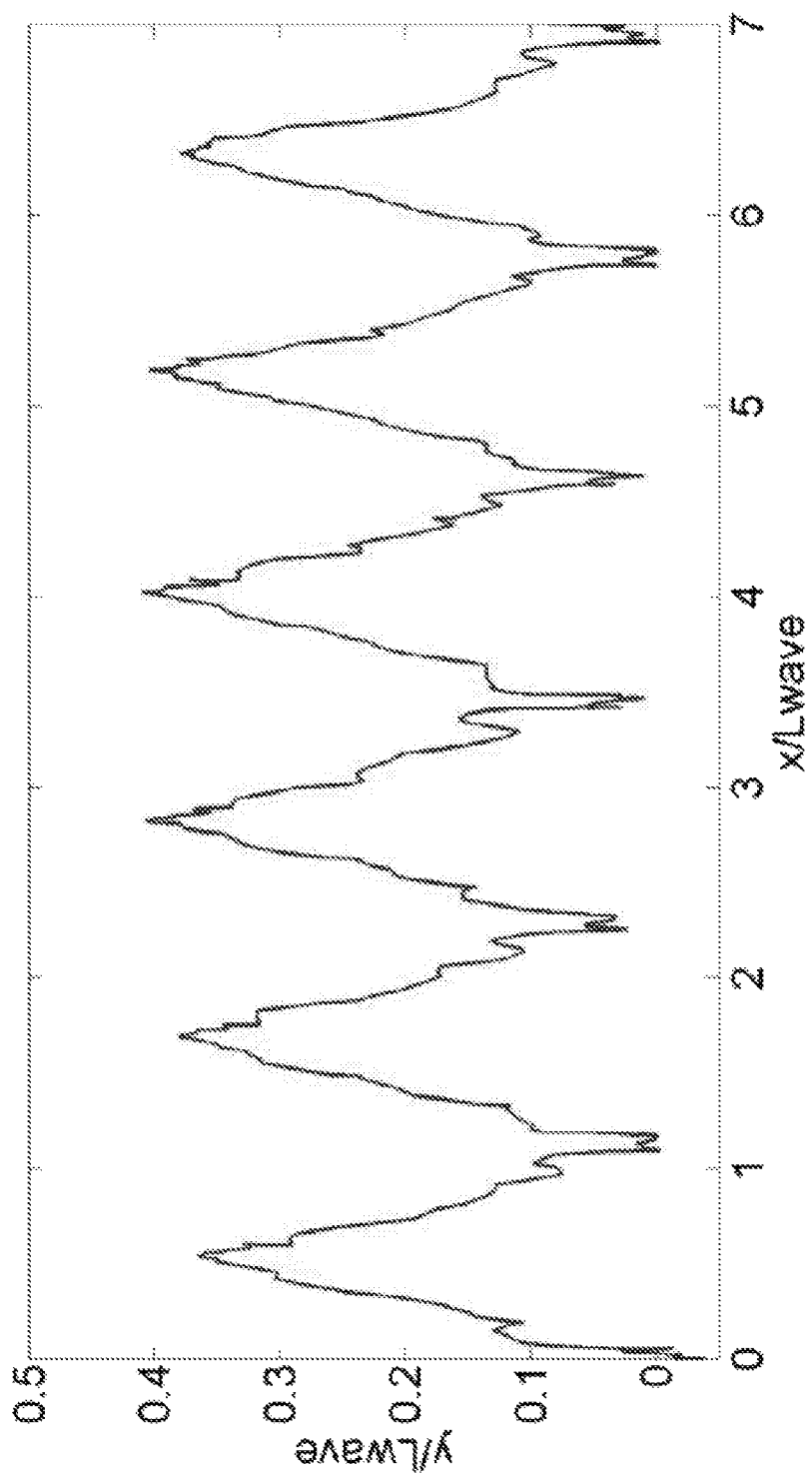
FIG. 22 illustrates the results of an experiment.

It has been found that the protrusions increase the speed of the robot beyond the speed of the wave. For example, in an embodiment wherein the length of the link $L_{link}$ is 1.4 cm and the height r is 1.75 cm, the robot achieved a speed which is 13% larger than the wave speed. The results of one of the experiments are presented in FIG. 22. In nearly 6 cycles, the robot advances by 7 wave lengths. An example of the length of the protrusions is 1 cm.

The following portion explains part of the kinematics concept of a preferred embodiment of the present invention:

Kinematics Analysis

In this section, the kinematics of the links are modeled and their speed is calculated relative to the head of the robot (motor housing) as a function of the frequency of locomotion f, the wave length $L_{wave}$ the amplitude of the wave A, the length of the link $L_{link}$, and its height r. If the links do not slide over the surface, the speed of the robot will be equal to the horizontal speed of the tips. We define the advance ratio (AR) as the speed of the robot $V_{robot}$ divided by the speed of the travelling wave relative to the motor base $V_{wave}$ $$AR = \frac{V_{robot}}{V_{wave}} = \frac{L_{cycle}}{L_{wave}} \quad (9)$$

where $V_{robot}$ is the speed of the robot, $L_{wave}$ is the length of the wave, and $L_{cycle}$ is the net advance per cycle (one rotation of the helix)

$$V_{robot} = fL_{cycle} \quad (10)$$

Kinematics of the Links

Figure 11:
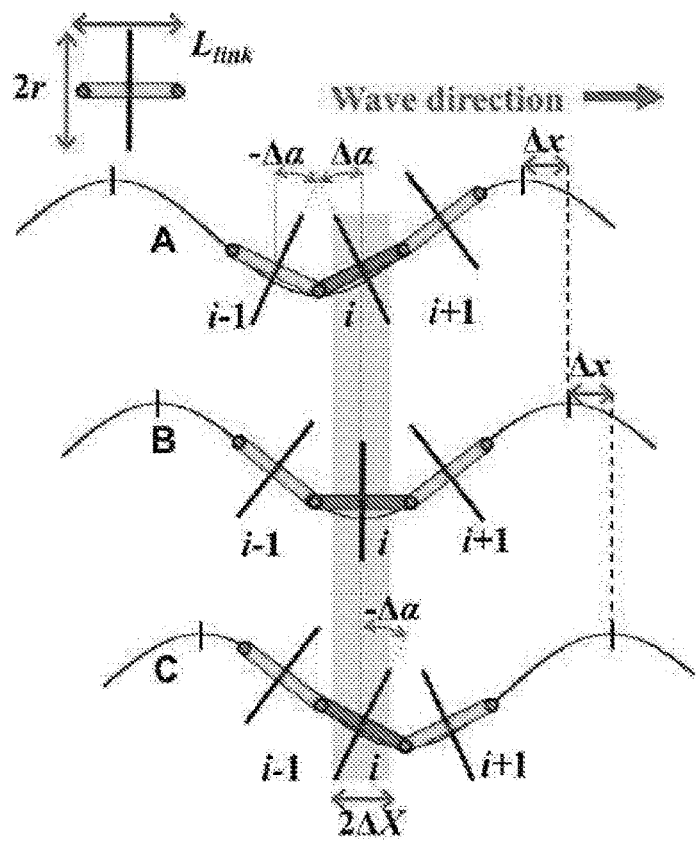
FIG. 11 illustrates the rotation of the links during the advance of the wave.

During the motion, the links move both horizontally and vertically. As the wave advances by αx, the link will rotate by Δα (as shown in FIG. 11). FIG. 11 shows the rotation of the links during the advance of the wave. "A" marks the beginning of the touchdown of link i and retraction of link i−1. In "B", the wave has advanced by Δx and link i is at the lowest point of the wave. "C", which occurs after the wave advances by a further Δx, marks the end of the touching of link "i" and the beginning of the engagement of i+1.

$$\Delta\alpha \underset{(x=\Delta x)}{=} a\tan\left(\frac{d}{dx}(A\cos(kx))\right) = a\tan(-kA\sin(k\Delta x)) \quad (11)$$

Due to this rotation, the tip of the link will move horizontally by a distance ΔX:

$$\Delta X = r \sin(\Delta\alpha) \quad (12)$$

If the speed of the wave is $V_{wave}$, the time required by the wave to advance by a distance of Δx is:

$$\Delta t = \Delta x / V_{wave} \quad (13)$$

Therefore the expected speed of the link is:

$$V_{link} = \frac{\Delta X}{\Delta t} \quad (14)$$

Inserting Eqs. (11)-(13) into Eq. (14) we obtain the speed of the tip of the link:

$$V_{link} = \frac{r\sin(a\tan(-kA\sin(k\Delta x)))}{\Delta x} V_{wave} \quad (15)$$

If we assume small angles Δα ≪ 1 then:

$$\Delta\alpha \ll 1 \Longrightarrow \begin{cases} \sin(k\Delta x) \approx k\Delta x \\ a\tan(Ak^2\Delta x) \approx Ak^2\Delta x \end{cases} \quad (16)$$

And finally, by inserting Eq. (16) into Eq. (15), one obtains the speed of the tips of the links as a function of the height r, amplitude A, wave length $L_{wave}$, and wave speed $V_{wave}$.

$$V_{link} \approx rAk^2V_{wave} = rA\left(\frac{2\pi}{L_{wave}}\right)^2 V_{wave} \quad (17)$$

Alternatively, the speed of the wave can be calculated as a function of the actuation frequency:

$$V_{link} \approx rAk^2V_{wave} = (2\pi)^2 \frac{A}{L_{wave}} rf \quad (18)$$

Therefore the speed of the link is proportional to the ratio of the amplitude divided by the wave length $A/L_{wave}$, to the height of the links r and to the actuation frequency f. In theory, it would be advantageous to increase $A/L_{wave}$ and r to increase the speed. However, increasing those values may result in collision between the tips of neighboring links. This collision is most likely to occur when two links are symmetrically oriented towards each-other such as links i−1 and i in FIG. 11 case A. Assuming zero width of the tips of the links, collision will occur when;

$$a\tan\left(\frac{L_{link}/2}{r}\right) = \Delta\alpha \qquad (19)$$

Inserting the value of $\Delta\alpha$ into from Eq. (11) into (19), it is possible to obtain the condition of collision as a function of the size of the links and the wave parameters.

$$\left(\frac{\frac{L_{link}}{2}}{r}\right) \approx -kA\sin\left(k\frac{\left(\frac{L_{link}}{2}\right)^2}{\left(r^2+\left(\frac{L_{link}}{2}\right)^2\right)^{0.5}}\right) \qquad (20)$$

Simulating the Kinematics of the Links

The links typically slide along the advancing wave (rotating helix) while the first link is attached to the motor housing. The number of links is determined by the length of the wave $L_{tot}$ divided by the length of the links.

$$L_{tot} = N\int_0^L \left(1+\left(\frac{d}{dx}y(x)\right)^2\right)^{0.5} dx \qquad (21)$$

where N is the number of waves in the sine function (e.g. N=2). To calculate the positions of all the links of the robot, it has been sequentially solved for the location of the endpoint of each link along the sine wave. That is, starting with the location of the joint i of link $[x_i\ y_i]$ and solving for the x coordinate of the link's endpoint $[x_{i+1}\ y_{i+1}]$ by assuming that it is fastened to the sine wave using the equation:

$$(x_{i+1}-x_i)^2+(A\sin(kx_{i+1}-\omega t)-y_i)^2=L_{link}^2 \qquad (22)$$

where $L_{link}$ is the length of each link. Solving Eq. (22) returns the position of the end point $x_{i+1}$ of link i. The endpoint of link "i" serves as the start point of link "i+1", and so on until the last link's location is solved for. The location of each link's start point and end point provides complete information of the link's orientation, and is used to calculate the location of the links' tip $[x\_tip_i\ y\_tip_i]$:

$$\begin{bmatrix} x\_tip_i \\ y\_tip_i \\ 0 \end{bmatrix} = \begin{bmatrix} x_i \\ y_i \\ 0 \end{bmatrix} + \frac{1}{2}\begin{bmatrix} x_{i+1}-x_i \\ y_{i+1}-y_i \\ 0 \end{bmatrix} + \begin{bmatrix} x_{i+1}-x_i \\ y_{i+1}-y_i \\ 0 \end{bmatrix} \times \begin{bmatrix} 0 \\ 0 \\ 1 \end{bmatrix} r \qquad (23)$$

The position of the links when the motor housing is fixed was simulated using MATLAB™ (2013). Equations (22) and (23) were solved at a rate of 500 times per cycle (results and optimization are summarized in FIG. 12 and in Table I). The velocity is obtained by deriving the position as a function of the time. In the simulation, we also accounted for the width of the tip of the link, since in practice, the width must be a few millimeters (in the simulation, the following value has been used $w_{tip}$=0.05 $L_{wave}$).

Figure 13:
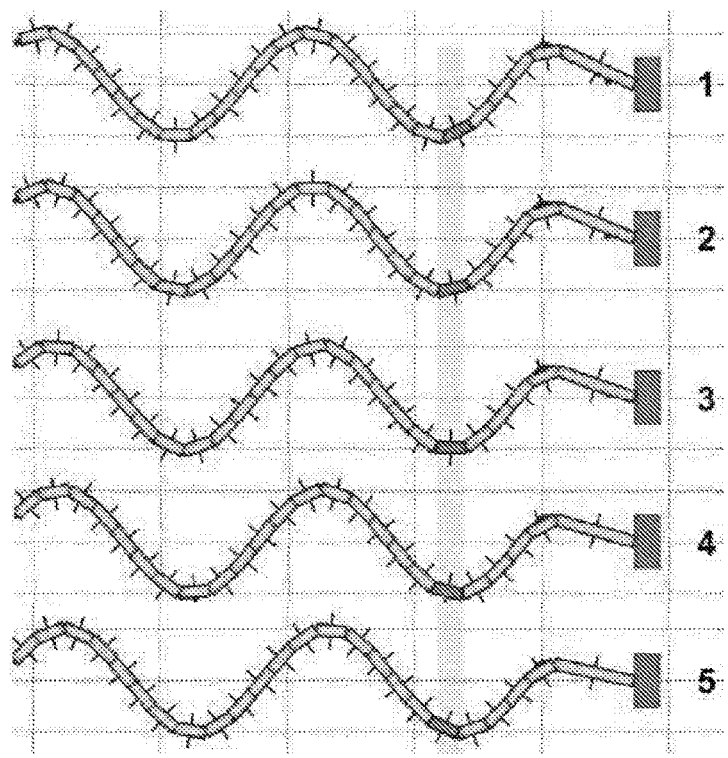
FIG. 13 illustrates a two dimensional side projection of the simulated robot.

A two dimensional side projection of the simulated robot is shown in FIG. 13. The "motor housing" is rigidly fixed. As the wave advances from right to left, the lower tips of the links which will be in contact with the surface move slightly towards the left and rotate clockwise. The robot consists of 25 rigid links connected through revolute joints formed into a sine wave of two spatial cycles. The motion of link 5 is hereby focused upon. As link 5 approaches the lower bottom of the wave, it moves slightly horizontally and rotates clockwise. Both of these motions add up to move the bottom tip to the left, and therefore the robot would move to the right.

Expected Robot Advancement Speed

The simulation allowed to visually gain insights into the motion of the links and optimize the design of the robot. If no sliding occurs, the speed of the robot will be equal (but to the opposite direction) to the horizontal speed of the links contacting the surface. Therefore, the simulation calculates the position of the different links at all times and detects which of the links is the lowest, i.e. expected to be in contact with the ground. Averaging the speed of the lowest tips yields the expected speed of the robot.

Figure 12:
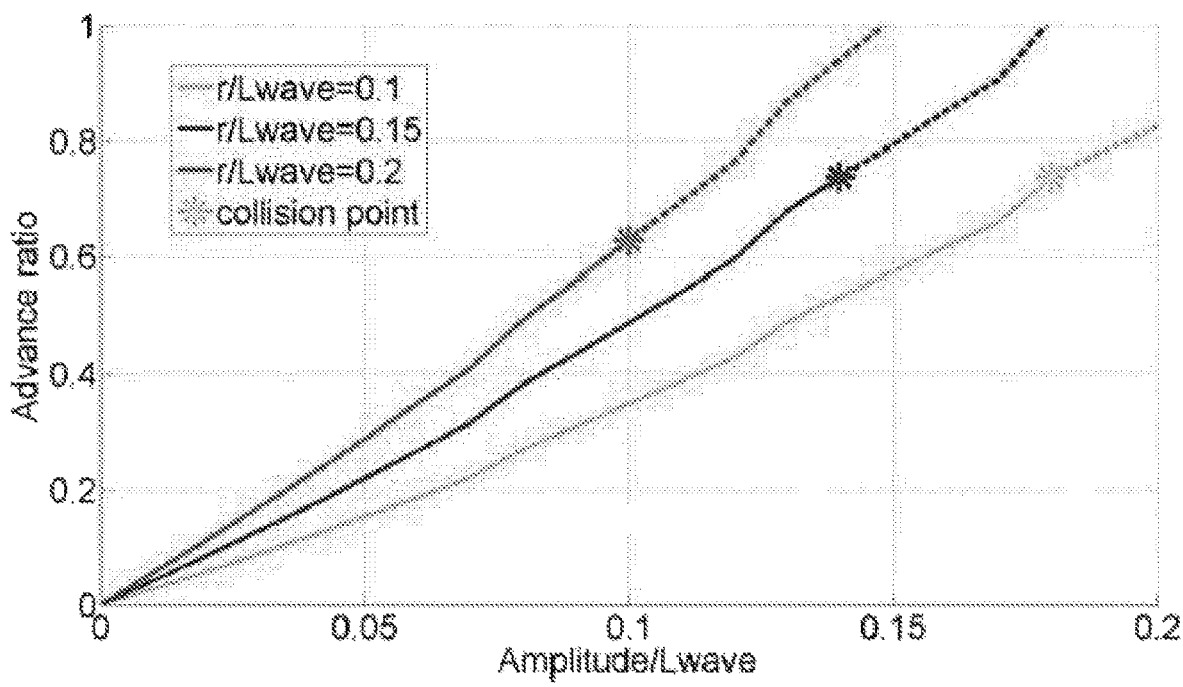
FIG. 12 illustrates a graph of the advance ratio presented as a function of the amplitude for 3 different values of links heights.

In FIG. 12, the advance ratio is presented as a function of the amplitude for 3 different values of links heights (r/Lwave) 0.1, 0.15 and 0.2. For larger values, the links collide with each-others and a much smaller r is mechanically impractical (minimum diameter of the helix, thickness of the links and the gaps between the links and the helix). FIG. 12 shows the advance ratio (AR) as a function of the amplitude for three different heights. The asterix (*) marks the limit for which two neighboring links will collide with each other. By assuming that the width of the tips is 5% of the wave length, we found that the maximum AR is limited to nearly 0.7 in all three cases because of the collisions between the tips of neighboring links.

The values obtained by the simulation were a few percent different than the experimental results but were about 10-15% lower than the approximated values obtained from Eq. (18).

Experiments

Figure 14:
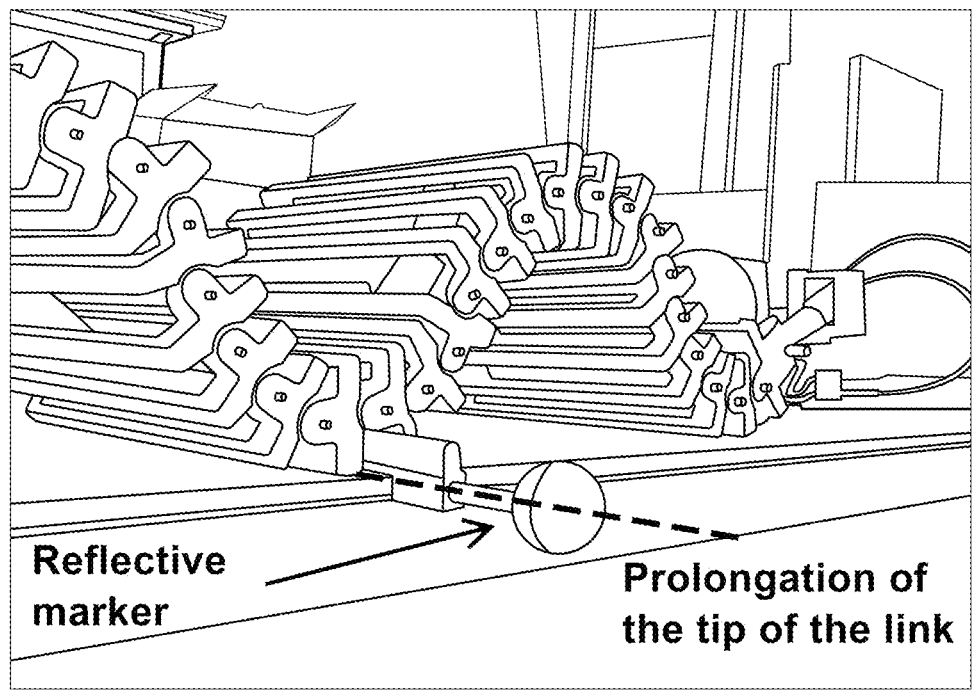
FIG. 14 illustrates an embodiment of the present invention with a marker.

Hereinabove, the speed of the links as a function of the different robot parameters such as the length of the wave, the distance between the links, and their width was calculated. In this section, the speed of the 3D printed robot was experimentally measured and compared to the results of the simulation. The position of the robot was measured using a 12 cameras Optitrack setup with a frequency of 120 Hz. The accuracy of the system is nearly 0.1 mm. A special link was designed for holding the reflective marker at the lower tip of the link (FIG. 14). The special link has a side attachment for the marker in which the center of the marker is on the axis of the contact line with the surface (along the axis of the tip of the link). Using this link, the marker remained on the side of the surface and would not interfere with the experiment. The speed is determined by deriving the position as a function of the time.

Speed of the Links

Figure 15:
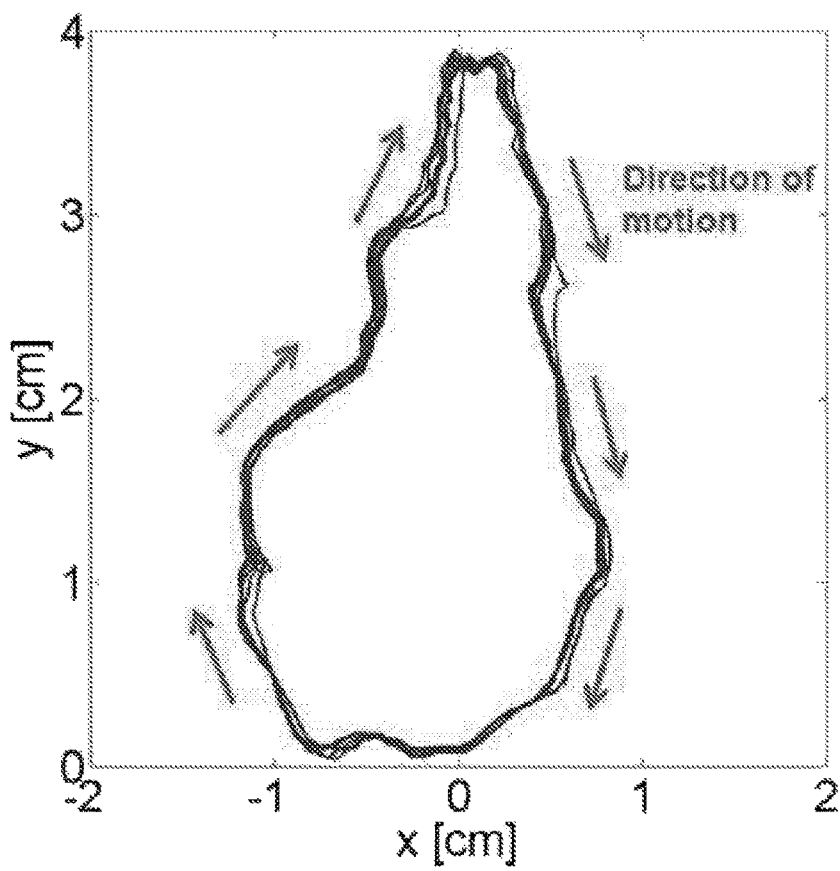
FIG. 15 illustrates the motion of the bottom tip of a link during 8 cycles.

In the first experiment, the following was determined—the trajectory of the lower tip of one of the links (using the special link) when the robot motor house was rigidly fixed. The trajectory and the orientation of the tip of 8 cycles are presented in FIG. 15 (the motion of the bottom tip of the link during 8 cycles when the robot is not moving wherein the arrows show the direction of motion).

The motion is very cyclic with very little difference between one cycle and another. During a cycle, the tip moves vertically by nearly 4 cm. This result is slightly less than expected (2*A=4.2 cm) and probably due to slight spacing between the links and the helix (about two millimeters from each side). The horizontal motion is nearly 2 cm. However, the motion of the link from the onset of contact until disconnecting from the surface is nearly 1 cm.

Figure 16:
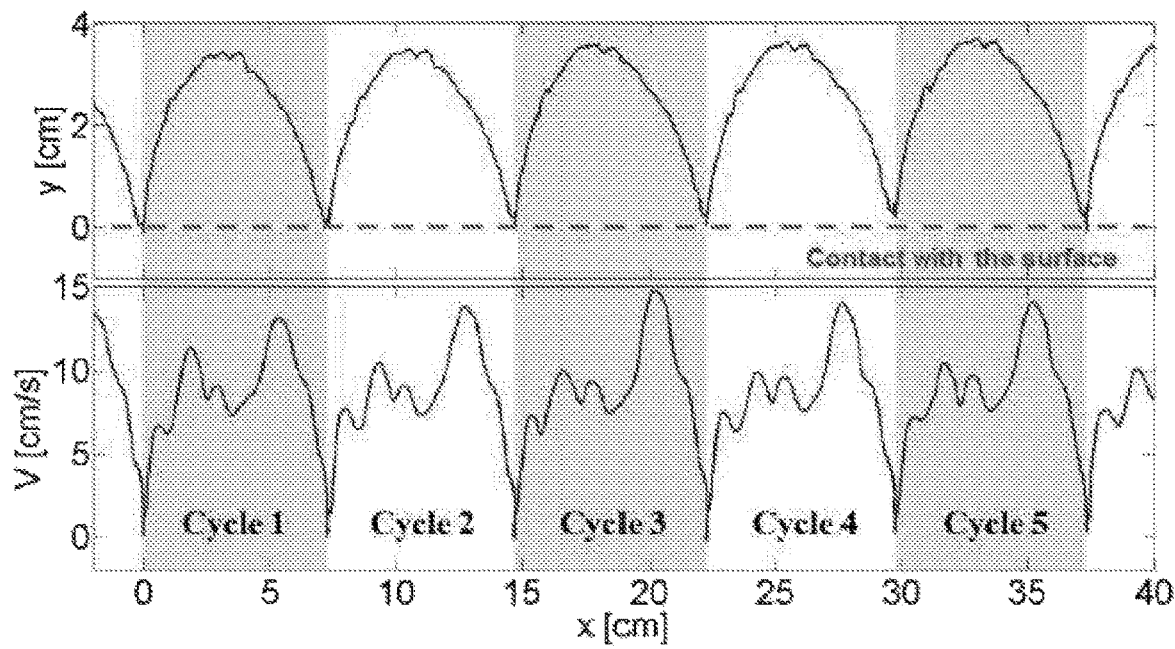
FIG. 16 illustrates a graph of the position and speed of the link.

In the second experiment, the robot was free to advance and the position of the links was measured using the Optitrack setup. The experiments were performed over plywood and over aluminum which has a lower coefficient of friction (COF) with the links (nearly 0.3 whereas the COF over plywood is nearly 0.4). The results of the trajectory and the speed along the x axis are presented in FIG. 16 (over aluminum surface). FIG. 16 shows: (Top) The position of the lowest tip of a link during horizontal locomotion over aluminum surface. The single point contact at each cycle proves that no sliding occurred between the links and the surface. (Bottom) The horizontal speed of the links.

Table 1, summarizes the results of multiple experiments that were performed with the bigger version and the smaller version (1:2) of the robot, wherein the bigger version length was 25 cm long and the smaller version was scaled down by a factor of 2. The data is the average of at least 12 cycles. The results were compared to the simulations and found to be within a few percentage of each-others. The larger and smaller versions performed nearly similarly for two different amplitude to wave length ratios (A/Lwave). Following the predictions of the simulation, special links were designed with larger r that allowed the robot to advance by 13% faster than the speed of the wave (AR=1.13). It is noted here that to the best of our knowledge, travelling faster than the speed of the wave (which at first glance may appear impossible), has never been previously reported in literature.

TABLE I

The advance ratio as a function of the slope.

| $L_{wave}$ [cm] | $A/L_{wave}$ [cm] | $r/L_{wave}$ [cm] | Aver. AR $L_{cycle}/L_{wave}$ | STD AR | $\Delta AR/L_{cycle}$ |
|---|---|---|---|---|---|
| Large SAW | | | | | |
| 10.4 | 0.2 | 0.088 | 0.71 | 1.7% | 2% |
| 10 | 0.1 | 0.092 | 0.33 | 1.7% | 5% |
| 10.4 | 0.2 | 0.168 | 1.13 | 4.3% | 2% |
| Small SAW | | | | | |
| 5 | 0.2 | 0.092 | 0.76 | 7.7% | 8% |
| 5 | 0.1 | 0.092 | 0.38 | 4.4% | 8% |

The energy requirement for crawling was measured. Using 8 Volts input, the robot consumed 0.18 Amperes current and crawled at about 15 cm/s. Based on those results, the cost of transport of SAW (defined as the input power divided by the weight times the speed) is 3.8.

High Speeds

Multiple experiments were performed to reach higher speeds with the robot. In the first experiment, the same set up was used, but the robot was powered with two Lithium-ion batteries in series producing 8 Volts instead of a single battery. The robot reached a speed of 10.4 cm/s. In the second experiment, three batteries were attached in series (12 Volts) and used a 1:100 gear ratio (instead of 1:300). In this configuration, the robot crawled at 23 cm/s. It is noted that even at high speed no sliding was observed between the robot and the surface.

Crawling Over Slopes and Vertically Between Walls

Figure 17:
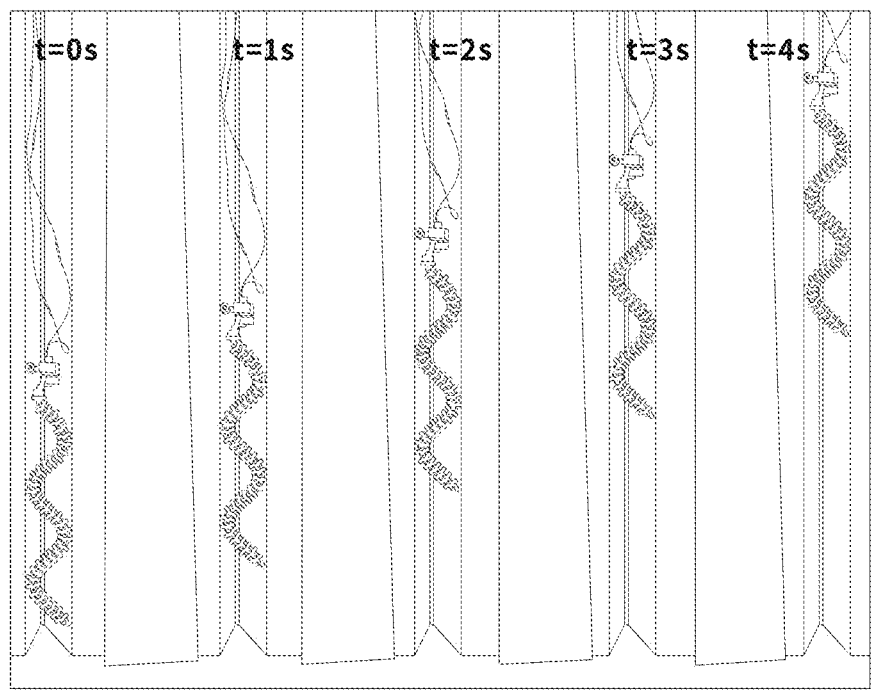
FIG. 17 illustrates the robot climbing vertically between two walls.

The ability of the robot to climb was also tested by placing the robot between two layers of polyurethane foam whose COF with the links of the robot is nearly 0.4. The robot was powered by two Lithium ion battery (as it was not able to move using a single one) and climbed at a speed of 8.2 cm/s. The experiment is presented in FIG. 17, showing the robot climbing vertically between two walls, using 8V input, the robot reached a speed of 8.2 cm/s. Note that in this experiment, the two "walls" must be precisely distanced from each other (preferably up to a few millimeters of accuracy) in order to achieve enough normal force for climbing, but without overly pressing on the robot as it will stall.

Crawling Over Obstacles

Figure 18:
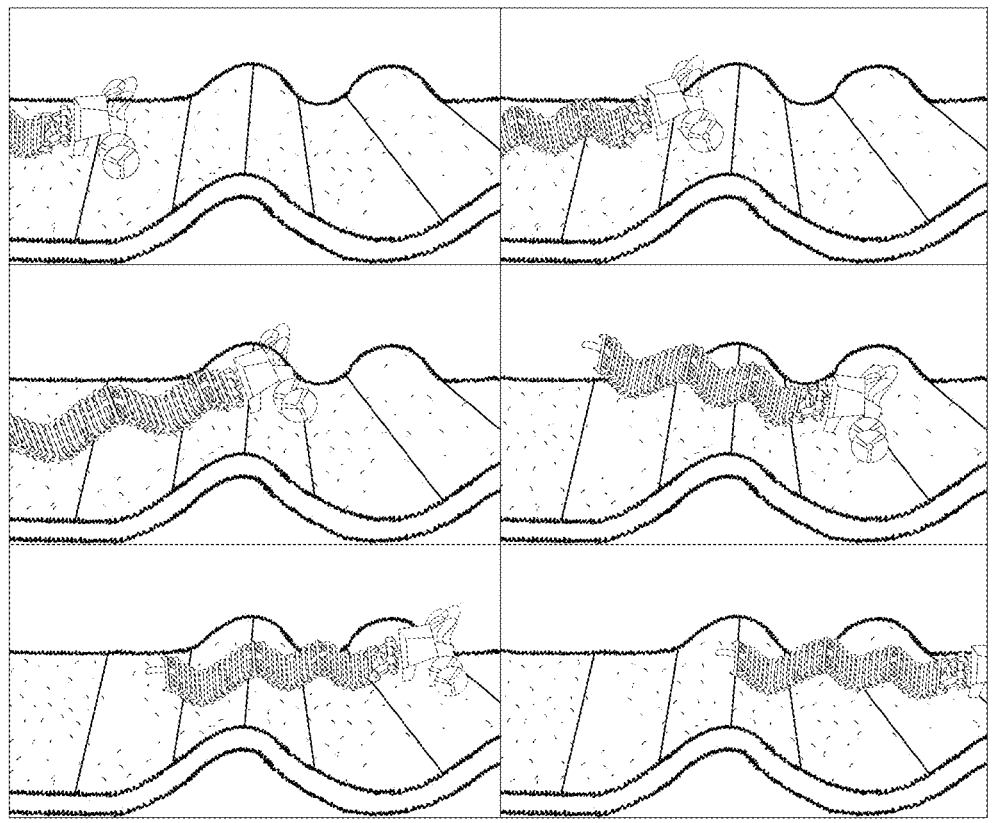
FIG. 18 illustrates a typical obstacle that the present invention climbs.

In order to prove the robot's ability to crawl over challenging terrain, it was tested in climbing over multiple obstacles. One of those obstacles, composed of two 8 centimeters high rises is presented in FIG. 18. The surface is made of carpet to ensure high COF and the robot was capable of repeatedly overcoming this double obstacle.

Miniaturization

Figure 19:
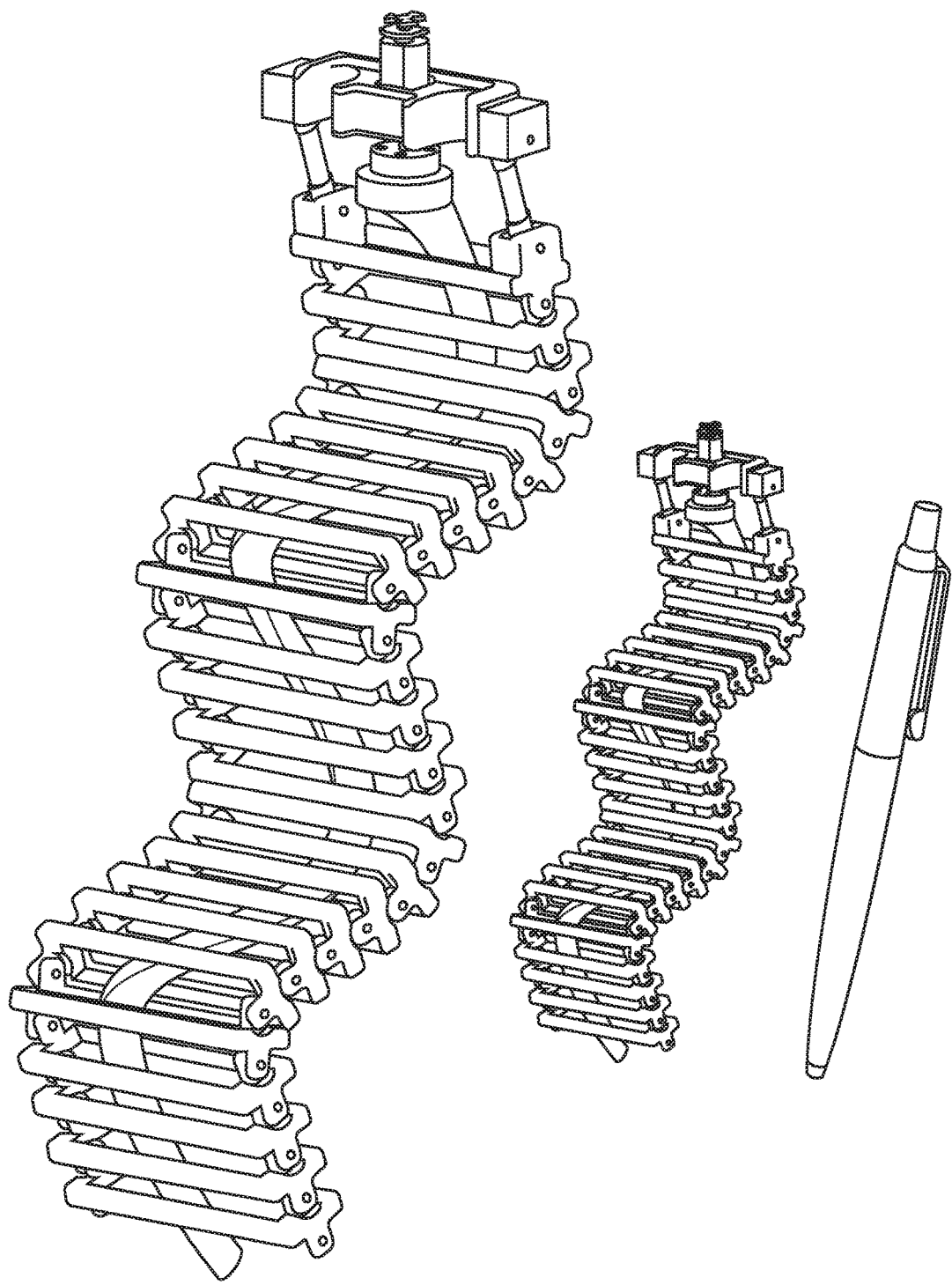
FIG. 19 illustrates a miniature embodiment of the snake robot of the present invention.

The single motor design allows for robots of several sizes. A most particular small robot is shown in FIG. 19. The robot is 12 cm long and 3 cm wide and weighs 30 grams including the motor and battery. It crawled at nearly 8 cm/s. Further miniaturization of the robot is possible and depends on more precise manufacturing.

Thus, the present invention robot snake preferred embodiment is a novel robot which generates an advancing wave that is nearly identical to a sine wave by rotating a helix that moves the links. The robot design is simple, lightweight, cheap, and requires only a single motor to produce the wave. The direction of wave propagation is determined by the sign of the voltage being applied to the motor.

Two prototype examples are given: the larger one with a wave length of 10 cm that weighs only 188 grams and a 1:2 smaller version weighing 47 grams. Both prototypes proved to be highly reliable (considering that they are 3D printed prototypes). During all of our experiments, almost no maintenance was required.

The kinematics of the links was studied and a simple model was developed that explains how the motion is produced. The model also predicts the approximated speed of the lower tips of the links as a function of the wave length and amplitude and size of the links. A simulation was also developed which calculates the speed and visually presents the locomotion and detects where collisions between the links will occur. The simulation allows to visually comprehend the locomotion mechanics and to optimize the robot. The advance ratio (AR) was introduced as the speed of the robot divided by the speed of the wave. It was found that in general, the AR is smaller than 1, but by increasing the height of the links, the advance ratio can be larger than 1 (this result may seem physically impossible at first glance).

The speed of the robot was measured along with the speed of the lower tip of a link using an Optitrack system. By measuring the speed of the lower tip of the link, it was found that it contacts the surface at a single point, implying that sliding does not occur. Multiple experiments were performed that found that they are all within a few percentages from the expected speed by the simulation. The experiments also proved that the robot can advance faster than its own wave (13% in some experiments). By applying 12 Volts to the motors, the robot moved at up to 57 cm/s and no sliding was detected even in this case. The robot was also capable of climbing vertically when finely placed between two surfaces polyurethane foam at a speed of 8.2 cm/s. According to an embodiment of the present invention, two SAW robots are attached together through an actuated U joint, thus attaching two robots to each other and propagating as a single unit. The actuated U joint may allow the combined robot to climb.

According to one embodiment, the robot is covered with a waterproof element. In this case the robot was able to swim at 6 cm per second.

While some of the embodiments of the invention have been described by way of illustration, it will be apparent that the invention can be carried into practice with many modifications, variations and adaptations, and with the use of numerous equivalents or alternative solutions that are within the scope of a person skilled in the art, without departing from the spirit of the invention, or the scope of the claims.

The invention claimed is:

1. A device for transferring rotational, mechanical motion into sinusoidal wave-like motion, said device comprising:
   a. at least one motor, generating rotational movement around a first Cartesian axis;
   b. an elongated rod, curved in the form of a helix, substantially aligned along said first Cartesian axis, and rotated by the at least one motor;
   c. a surface comprised of discrete, connected hollow elements, wherein:
      i. the elongated rod is interlaced within said discrete connected hollow elements, such that the surface is undulated, and the rotation of the elongated rod dynamically changes the surface's shape, moving the discrete connected hollow elements along a second perpendicular Cartesian axis, thus creating a wave like motion;
      ii. the width of each said discrete connected hollow element is larger than the diameter of the helix-shaped rod, so that while rotating, the elongated rod is freely movable within the cavity of the discrete connected hollow elements, along a third perpendicular Cartesian axis;
      iii. said surface interacts with the surrounding medium or base-surface upon which the device is moving, wherein said interaction is generated by said wave-like motion, such that said interaction creates a propelling force that drives said device forward or backward along said first Cartesian axis;
   wherein said discrete connected hollow elements are implemented as a plurality of hollow links connected in series, wherein said helix-shaped rod passes through said plurality of hollow links; and
   wherein each link comprises a hollow rectangular shape with two side members, a top member and a bottom member, forming the rectangular shape.

2. The device of claim 1 wherein the pitch of the helix-shaped rod corresponds with the wave length of the created wave-shaped surface.

3. The device of claim 1, wherein each link comprises two distal arms extending distally from the side members, one distal arm from each side member; and each link comprises two proximal arms extending proximally from the side members, one proximal arm from each side member.

4. The device of claim 3, wherein the angle between each distal arm and the side member it extends from is substantially a right angle; and wherein the angle between each proximal arm and the side member it extends from is substantially a right angle.

5. The device of claim 3, wherein each pair of distal arms of each of the links in the series, which has a distal link, connects to the proximal arms of the adjacent distal link in the series.

6. The device of claim 3, wherein
   a. each proximal arm and each distal arm comprises an aperture;
   b. the proximal and distal arms comprise inner recessed regions;
   c. each pair of distal arms of each of the links in the series that has a distal link, connect to the proximal arms of the adjacent distal link in the series;
   d. the recessed regions of the distal arms of the link face the recessed regions of the proximal arms of the distal link such that the apertures in each distal arm of the link are aligned with the corresponding apertures on the same side in each proximal arm of the distal link forming pairs of aligned apertures; and
   e. connecting means are inserted into each pair of aligned apertures.

7. The device of claim 3, wherein the at least one motor is placed within a housing, and said housing is connected by means of hinge joints to two proximal arms extending proximally therefrom; and wherein the two proximal arms are connected at their proximal ends to the most distal link in the series of connected links to the most distal link's distal arms.

8. The device of claim 7, wherein the two proximal arms extending proximally from the motor housing each comprise an aperture near their proximal ends which are placed in a manner such that they are aligned with the corresponding apertures of the distal arms of the most distal link in the series of connected links forming pairs of aligned apertures; and wherein connecting means are inserted into each pair of aligned apertures.

9. The device of claim 1, wherein the top member and/or the bottom member of each rectangular link includes protrusions that elongate the distance between the center of said rectangular links and their point of contact with the ground, thus increasing the device's travelled distance within each full rotation of the helix-shaped rod.

10. The device of claim 9, wherein the protrusions of each adjacent pair of rectangular links are designed in a spatially complementary manner, so as not to interfere with one another's movement, and not collide during the wave-like motion of said surface.

11. The device of claim 9, wherein the protrusions of each adjacent group of three or more rectangular links are designed in a spatially complementary manner, so as not to interfere with one another's movement, and not to collide during the wave-like motion of said surface.

12. The device according to claim 1, wherein the cross-section of the helix-shaped rod is round.

13. A device for transferring rotational, mechanical motion into sinusoidal wave-like motion, said device comprising:
   a. at least one motor, generating rotational movement around a first Cartesian axis;
   b. an elongated rod, curved in the form of a helix, substantially aligned along said first Cartesian axis, and rotated by the at least one motor;
   c. a surface comprised of discrete, connected hollow elements, wherein:
      i. the elongated rod is interlaced within said discrete hollow elements, such that the surface is undulated, and the rotation of the elongated rod dynamically changes the surface's shape, moving the discrete hollow elements along a second perpendicular Cartesian axis, thus creating a wave like motion;
      ii. the width of each said discrete hollow element is larger than the diameter of the helix-shaped rod, so that while rotating, the elongated rod is freely movable within the cavity of the discrete hollow elements, along a third perpendicular Cartesian axis;
      iii. said surface interacts with the surrounding medium or base-surface upon which the device is moving, wherein said interaction is generated by said wave-like motion, such that said interaction creates a propelling force that drives said device forward or backward along said first Cartesian axis;

wherein the discrete hollow elements individually rotate about said third perpendicular Cartesian axis during said wave-like motion, so as to apply a force component in the direction of the first Cartesian axis on the base-surface, at the point of contact of each discrete hollow element with the base-surface, thus propelling the device forward in the direction of the first Cartesian axis direction.

14. The device of claim 13, wherein if the device is set to move upon a horizontal surface, said wave-like motion will include movement of the discrete hollow elements along the vertical axis, and thus will enable the device to overcome obstacles in its path by climbing over them.

15. The device of claim 13, wherein one or more of the discrete hollow elements are at a position being lower discrete hollow elements and one or more of the discrete hollow elements are at a position being upper discrete hollow elements; and wherein if the device is set to move upon a horizontal surface, said force component in the direction of the first Cartesian axis will be applied by both the lower discrete hollow elements and upper discrete hollow elements, so as to enable the device to advance through horizontal narrow passageways defined by walls that are in contact with the device from above and below.

16. The device of claim 13, wherein if the device is set to move through vertical narrow passageways defined by walls that are in contact with the device on both sides of the wave-like shaped surface, said force component in the direction of the first Cartesian axis will be applied by discrete hollow elements on both sides of the wave-like shaped surface, so as to enable the device to advance upwards or downwards through said narrow vertical passageway.

17. A device for transferring rotational, mechanical motion into sinusoidal wave-like motion, said device comprising:
   a. at least one motor, generating rotational movement around a first Cartesian axis;
   b. an elongated rod, curved in the form of a helix, substantially aligned along said first Cartesian axis, and rotated by the at least one motor;
   c. a surface comprised of discrete, connected hollow elements, wherein:
      i. the elongated rod is interlaced within said discrete connected hollow elements, such that the surface is undulated, and the rotation of the elongated rod dynamically changes the surface's shape, moving the discrete connected hollow elements along a second perpendicular Cartesian axis, thus creating a wave like motion;
      ii. the width of each said discrete connected hollow element is larger than the diameter of the helix-shaped rod, so that while rotating, the elongated rod is freely movable within the cavity of the discrete connected hollow elements, along a third perpendicular Cartesian axis;
      iii. said surface interacts with the surrounding medium or base-surface upon which the device is moving, wherein said interaction is generated by said wave-like motion, such that said interaction creates a propelling force that drives said device forward or backward along said first Cartesian axis;
   wherein said device further comprises at least one wheel located at one extremity of the device along the first Cartesian axis, enabling a user to steer the device in a preferred direction.

18. The device of claim 17, further comprising a microcontroller, enabling a user to control at least one of the following parameters of the device's motion:
   a. speed of motor rotation;
   b. velocity of the wave-like motion of the undulated surface;
   c. speed of the device's propagation upon the base-surface;
   d. direction of the device's propagation along the first Cartesian axis;
   e. steering direction of the at least one wheel.

19. A device for transferring rotational, mechanical motion at a first Cartesian axis, into cyclic motion along a second perpendicular Cartesian axis, said device comprising:
   a. at least one motor, generating rotational movement around a first Cartesian axis;
   b. an elongated rod curved in a specific shape, substantially aligned along said first Cartesian axis, and rotated by the at least one motor;
   c. a surface comprised of discrete, connected hollow elements, wherein:
      i. the elongated rod is interlaced within said discrete hollow elements, such that the surface is shaped, and the rotation of the elongated rod dynamically changes the surface's structure in accordance with the elongated rod specific shape, moving the discrete hollow elements along a second perpendicular Cartesian axis, thus creating a cyclic motion;
      ii. the width of each said discrete hollow element is larger than the diameter of the elongated rod, so that while rotating, the elongated rod is freely movable within the cavity of the discrete hollow elements, along a third perpendicular Cartesian axis;
      iii. said surface interacts with the surrounding medium or base-surface upon which the device is moving, wherein said interaction is generated by said cyclic motion, such that said interaction creates a propelling force that drives said device forward or backward along said first Cartesian axis;
   wherein said discrete connected hollow elements are implemented as a plurality of hollow links connected in series, wherein said elongated rod passes through said plurality of hollow links; and
   wherein each link comprises a hollow rectangular shape with two side members, a top member and a bottom member, forming the rectangular shape.

20. A method for transferring rotational, mechanical motion at a first Cartesian axis, into sinusoidal wave-like motion along a second perpendicular Cartesian axis, said method comprising:
   a. generating rotational movement around a first Cartesian axis of an elongated rod curved in a helix shape, substantially aligned along said first Cartesian axis, and rotated by at least one motor;
   b. moving the elongated rod within the cavity of connected discrete hollow elements, such that the discrete hollow elements form a surface having a wave-like shape, and the rotation of the curved rod dynamically changes the surface's structure in accordance with the curved rod specific shape, moving the discrete hollow elements along a second perpendicular Cartesian axis, thus creating a wave like motion;
   wherein said surface interacts with the surrounding medium or base-surface upon which the surface is moving, wherein said interaction is generated by said wavelike motion, such that said interaction creates a propelling force that drives said surface forward or backward along said first Cartesian axis;

wherein said discrete hollow elements are implemented as a plurality of hollow links connected in series, wherein said elongated rod passes through said plurality of hollow links; and wherein each link comprises a hollow rectangular shape with two side members, a top member and a bottom member, forming the rectangular shape.

* * * * *